United States Patent
Krebs

(10) Patent No.: US 8,121,985 B2
(45) Date of Patent: Feb. 21, 2012

(54) DELTA VERSIONING FOR LEARNING OBJECTS

(75) Inventor: Andreas S. Krebs, Karlsruhe (DE)

(73) Assignee: SAP Aktiengesellschaft, Walldorf (DE)

( * ) Notice: Subject to any disclaimer, the term of this patent is extended or adjusted under 35 U.S.C. 154(b) by 1060 days.

(21) Appl. No.: 11/258,527

(22) Filed: Oct. 24, 2005

(65) Prior Publication Data

US 2007/0111185 A1   May 17, 2007

(51) Int. Cl.
*G06F 7/00* (2006.01)
(52) U.S. Cl. ........................ 707/687; 707/695
(58) Field of Classification Search ............... 707/104.1, 707/100, 10, 203, 999.104, 999.102, 687, 707/695
See application file for complete search history.

(56) References Cited

U.S. PATENT DOCUMENTS

| | | | |
|---|---|---|---|
| 4,599,692 A | 7/1986 | Tan et al. | |
| 5,008,853 A | 4/1991 | Bly et al. | |
| 5,310,349 A | 5/1994 | Daniels et al. | |
| 5,395,243 A | 3/1995 | Lubin et al. | |
| 5,584,699 A | 12/1996 | Silver | |
| 5,623,661 A * | 4/1997 | Hon | 707/1 |
| 5,675,802 A | 10/1997 | Allen et al. | |
| 5,692,125 A | 11/1997 | Schloss et al. | |
| 5,715,454 A * | 2/1998 | Smith | 707/690 |
| 5,727,950 A | 3/1998 | Cook et al. | |
| 5,788,508 A | 8/1998 | Lee et al. | |
| 5,802,514 A | 9/1998 | Huber | |
| 5,805,889 A * | 9/1998 | Van De Vanter | 717/107 |
| 5,810,605 A * | 9/1998 | Siefert | 434/362 |
| 5,820,386 A | 10/1998 | Sheppard, II | |
| 5,823,781 A | 10/1998 | Hitchcock et al. | |
| 5,852,812 A | 12/1998 | Reeder | |
| 5,864,869 A | 1/1999 | Doak et al. | |
| 5,881,315 A | 3/1999 | Cohen | |
| 5,904,485 A * | 5/1999 | Siefert | 434/322 |
| 6,011,949 A | 1/2000 | Shimomukai | |
| 6,014,134 A | 1/2000 | Bell et al. | |
| 6,029,043 A | 2/2000 | Ho et al. | |
| 6,091,930 A | 7/2000 | Mortimer et al. | |

(Continued)

FOREIGN PATENT DOCUMENTS

EP   1 071 253   1/2001

(Continued)

OTHER PUBLICATIONS

Notice of Allowance issued in U.S. Appl. No. 11/257,584 on Jul. 12, 2010; 6 pages.

(Continued)

*Primary Examiner* — Eliyah S Harper
(74) *Attorney, Agent, or Firm* — Fish & Richardson P.C.

(57) ABSTRACT

A method for versioning learning objects comprises identifying learning content, which includes a plurality of learning objects, for storage in a content repository. Each learning object comprises or contains at least one content file. The method then includes comparing first version information of a first of the content files to versioning information obtained from an object version file identifying a prior version of the particular learning object. In response to at least a portion of the first version information of the first content file matching a corresponding portion of the versioning information stored in the object version file, a pointer to a corresponding content file in the prior version of the learning object is stored in a new object version file.

20 Claims, 10 Drawing Sheets

U.S. PATENT DOCUMENTS

| Patent No. | | Date | Inventor | Ref |
|---|---|---|---|---|
| 6,099,320 | A | 8/2000 | Papadopoulos | |
| 6,112,024 | A * | 8/2000 | Almond et al. | 717/122 |
| 6,112,049 | A | 8/2000 | Sonnenfeld | |
| 6,118,973 | A | 9/2000 | Ho et al. | |
| 6,134,552 | A | 10/2000 | Fritz et al. | |
| 6,148,338 | A | 11/2000 | Lachelt et al. | |
| 6,149,438 | A | 11/2000 | Richard et al. | |
| 6,149,441 | A | 11/2000 | Pellegrino et al. | |
| 6,157,808 | A | 12/2000 | Hollingsworth | |
| 6,162,060 | A | 12/2000 | Richard et al. | |
| 6,164,974 | A | 12/2000 | Carlile et al. | |
| 6,175,841 | B1 | 1/2001 | Loiacono | |
| 6,195,528 | B1 | 2/2001 | Young et al. | |
| 6,216,164 | B1 | 4/2001 | Zaremba, Jr. | |
| 6,243,692 | B1 | 6/2001 | Floyd et al. | |
| 6,285,993 | B1 | 9/2001 | Ferrell | |
| 6,302,698 | B1 | 10/2001 | Ziv-El | |
| 6,315,572 | B1 | 11/2001 | Owens et al. | |
| 6,322,366 | B1 | 11/2001 | Bergan et al. | |
| 6,334,779 | B1 * | 1/2002 | Siefert | 434/322 |
| 6,336,813 | B1 * | 1/2002 | Siefert | 434/322 |
| 6,341,291 | B1 * | 1/2002 | Bentley et al. | 707/203 |
| 6,347,333 | B2 | 2/2002 | Eisendrath et al. | |
| 6,347,943 | B1 | 2/2002 | Fields et al. | |
| 6,353,447 | B1 | 3/2002 | Truluck et al. | |
| 6,368,110 | B1 | 4/2002 | Koenecke et al. | |
| 6,370,355 | B1 | 4/2002 | Ceretta et al. | |
| 6,381,444 | B1 | 4/2002 | Aggarwal et al. | |
| 6,386,883 | B2 * | 5/2002 | Siefert | 434/322 |
| 6,397,036 | B1 | 5/2002 | Thean et al. | |
| 6,398,556 | B1 | 6/2002 | Ho et al. | |
| 6,409,514 | B1 | 6/2002 | Bull | |
| 6,430,563 | B1 | 8/2002 | Fritz et al. | |
| 6,470,171 | B1 | 10/2002 | Helmick et al. | |
| 6,471,521 | B1 | 10/2002 | Dornbush et al. | |
| 6,473,794 | B1 | 10/2002 | Guheen et al. | |
| 6,505,031 | B1 | 1/2003 | Slider et al. | |
| 6,514,085 | B2 | 2/2003 | Slattery et al. | |
| 6,527,556 | B1 | 3/2003 | Koskinen | |
| 6,532,481 | B1 * | 3/2003 | Fassett, Jr. | 1/1 |
| 6,532,588 | B1 * | 3/2003 | Porter | 717/170 |
| 6,546,230 | B1 | 4/2003 | Allison | |
| 6,587,668 | B1 | 7/2003 | Miller et al. | |
| 6,606,480 | B1 | 8/2003 | L'Allier et al. | |
| 6,622,003 | B1 | 9/2003 | Denious et al. | |
| 6,633,742 | B1 | 10/2003 | Turner et al. | |
| 6,643,493 | B2 | 11/2003 | Kilgore | |
| 6,652,283 | B1 | 11/2003 | Van Schaack et al. | |
| 6,662,003 | B2 | 12/2003 | Elder et al. | |
| 6,674,992 | B2 | 1/2004 | Helmick et al. | |
| RE38,432 | E | 2/2004 | Fai et al. | |
| 6,688,891 | B1 | 2/2004 | Sanford | |
| 6,701,125 | B1 | 3/2004 | Lohse | |
| 6,709,330 | B1 | 3/2004 | Klein et al. | |
| 6,711,378 | B2 | 3/2004 | Kashima | |
| 6,729,885 | B2 | 5/2004 | Stuppy et al. | |
| 6,766,311 | B1 | 7/2004 | Wall et al. | |
| 6,801,751 | B1 | 10/2004 | Wood et al. | |
| 6,802,054 | B2 | 10/2004 | Faraj | |
| 6,827,578 | B2 | 12/2004 | Krebs et al. | |
| 6,884,074 | B2 | 4/2005 | Theilmann | |
| 6,905,883 | B1 | 6/2005 | Olmstead | |
| 6,978,115 | B2 | 12/2005 | Whitehurst et al. | |
| 6,988,138 | B1 | 1/2006 | Alcorn et al. | |
| 7,058,354 | B2 | 6/2006 | McCormick et al. | |
| 7,096,342 | B2 * | 8/2006 | Chiu et al. | 711/216 |
| 7,099,889 | B2 * | 8/2006 | Berks et al. | 707/695 |
| 7,110,989 | B2 | 9/2006 | Iemoto et al. | |
| 7,162,473 | B2 | 1/2007 | Dumais et al. | |
| 7,237,189 | B2 | 6/2007 | Altenhofen et al. | |
| 7,296,051 | B1 * | 11/2007 | Kasriel | 709/203 |
| 7,457,817 | B2 * | 11/2008 | Krishnaswamy et al. | 1/1 |
| 8,005,792 | B2 * | 8/2011 | Green et al. | 707/638 |
| 2001/0044728 | A1 | 11/2001 | Freeman et al. | |
| 2001/0047310 | A1 | 11/2001 | Russell | |
| 2002/0006603 | A1 | 1/2002 | Peterson et al. | |
| 2002/0042041 | A1 | 4/2002 | Owens et al. | |
| 2002/0049788 | A1 | 4/2002 | Lipkin et al. | |
| 2002/0061506 | A1 | 5/2002 | Catten et al. | |
| 2002/0064766 | A1 | 5/2002 | Cozens et al. | |
| 2002/0073236 | A1 | 6/2002 | Helgeson et al. | |
| 2002/0086267 | A1 | 7/2002 | Birkhoelzer et al. | |
| 2002/0138841 | A1 | 9/2002 | Ward | |
| 2002/0142278 | A1 | 10/2002 | Whitehurst et al. | |
| 2002/0168621 | A1 * | 11/2002 | Cook et al. | 434/350 |
| 2002/0174021 | A1 | 11/2002 | Chu et al. | |
| 2002/0178038 | A1 | 11/2002 | Grybas | |
| 2002/0188583 | A1 | 12/2002 | Rukavina et al. | |
| 2003/0013073 | A1 | 1/2003 | Duncan et al. | |
| 2003/0028588 | A1 | 2/2003 | McConnell et al. | |
| 2003/0046265 | A1 | 3/2003 | Orton et al. | |
| 2003/0049593 | A1 | 3/2003 | Parmer et al. | |
| 2003/0055699 | A1 | 3/2003 | O'Connor | |
| 2003/0073063 | A1 | 4/2003 | Dattaray et al. | |
| 2003/0073065 | A1 | 4/2003 | Riggs | |
| 2003/0074320 | A1 | 4/2003 | Riggs | |
| 2003/0074559 | A1 | 4/2003 | Riggs | |
| 2003/0082508 | A1 | 5/2003 | Barney | |
| 2003/0110215 | A1 | 6/2003 | Joao | |
| 2003/0113700 | A1 | 6/2003 | Simon | |
| 2003/0129575 | A1 | 7/2003 | L'Allier et al. | |
| 2003/0129576 | A1 | 7/2003 | Wood et al. | |
| 2003/0151629 | A1 | 8/2003 | Krebs et al. | |
| 2003/0152899 | A1 | 8/2003 | Krebs et al. | |
| 2003/0152900 | A1 | 8/2003 | Krebs et al. | |
| 2003/0152901 | A1 | 8/2003 | Altenhofen et al. | |
| 2003/0152902 | A1 | 8/2003 | Altenhofen et al. | |
| 2003/0152904 | A1 | 8/2003 | Doty, Jr. | |
| 2003/0152905 | A1 | 8/2003 | Altenhofen et al. | |
| 2003/0154176 | A1 | 8/2003 | Krebs et al. | |
| 2003/0157470 | A1 | 8/2003 | Altenhofen et al. | |
| 2003/0158871 | A1 * | 8/2003 | Fomenko | 707/203 |
| 2003/0163784 | A1 | 8/2003 | Daniel et al. | |
| 2003/0175664 | A1 | 9/2003 | Frangenheim et al. | |
| 2003/0175676 | A1 | 9/2003 | Theilmann et al. | |
| 2003/0180702 | A1 | 9/2003 | Kamikawa et al. | |
| 2003/0194690 | A1 | 10/2003 | Wessner et al. | |
| 2003/0195946 | A1 | 10/2003 | Yang | |
| 2003/0207245 | A1 | 11/2003 | Parker | |
| 2003/0211447 | A1 | 11/2003 | Diesel et al. | |
| 2003/0224339 | A1 | 12/2003 | Jain et al. | |
| 2003/0232318 | A1 | 12/2003 | Altenhofen et al. | |
| 2004/0009461 | A1 | 1/2004 | Snyder et al. | |
| 2004/0010629 | A1 | 1/2004 | Diesel et al. | |
| 2004/0076941 | A1 | 4/2004 | Cunningham et al. | |
| 2004/0081951 | A1 | 4/2004 | Vigue et al. | |
| 2004/0086833 | A1 | 5/2004 | Goldberg | |
| 2004/0110119 | A1 | 6/2004 | Riconda et al. | |
| 2004/0133437 | A1 | 7/2004 | Draper et al. | |
| 2004/0153440 | A1 | 8/2004 | Halevy et al. | |
| 2004/0202987 | A1 | 10/2004 | Scheuring et al. | |
| 2004/0210461 | A1 | 10/2004 | Bohle | |
| 2004/0229199 | A1 | 11/2004 | Ashley et al. | |
| 2004/0259068 | A1 | 12/2004 | Philipp et al. | |
| 2005/0014121 | A1 | 1/2005 | Eck et al. | |
| 2005/0060655 | A1 * | 3/2005 | Gray et al. | 715/745 |
| 2005/0114408 | A1 * | 5/2005 | Gold et al. | 707/203 |
| 2005/0131964 | A1 * | 6/2005 | Saxena | 707/203 |
| 2005/0131970 | A1 | 6/2005 | Salazar et al. | |
| 2005/0154699 | A1 | 7/2005 | Lipkin et al. | |
| 2005/0188297 | A1 | 8/2005 | Knight et al. | |
| 2005/0202392 | A1 | 9/2005 | Allen et al. | |
| 2005/0216506 | A1 * | 9/2005 | Theilmann et al. | 707/103 Y |
| 2005/0223318 | A1 | 10/2005 | Diesel et al. | |
| 2005/0227216 | A1 | 10/2005 | Gupta | |
| 2006/0004886 | A1 * | 1/2006 | Green et al. | 707/203 |
| 2006/0008789 | A1 | 1/2006 | Gerteis | |
| 2006/0223044 | A1 * | 10/2006 | Behbehani | 434/365 |
| 2007/0111181 | A1 | 5/2007 | Hochwarth et al. | |

FOREIGN PATENT DOCUMENTS

| | | |
|---|---|---|
| GB | 2373625 A | 9/2002 |
| WO | WO/98/53384 | 11/1998 |
| WO | WO 99/09490 | 2/1999 |
| WO | WO 00/54128 | 9/2000 |
| WO | WO 02/21379 | 3/2002 |
| WO | WO 02/073442 A | 9/2002 |

OTHER PUBLICATIONS

Advisory Action issued in U.S. Appl. No. 11/301,595 on Mar. 29, 2010; 3 pages.

Office Action issued in U.S. Appl. No. 11/258,520 on Apr. 29, 2010; 22 pages.

Advisory Action issued in U.S. Appl. No. 11/258,520 on Jun. 25, 2010; 3 pages.

Office Action issued in U.S. Appl. No. 11/258,520 on Oct. 1, 2010; 25 pages.

Office Action issued in U.S. Appl. No. 11/258,457 on Sep. 21, 2010; 7 pages.

Office Action issued in U.S. Appl. No. 11/257,585 on Jun. 25, 2010; 11 pages.

Office Action issued in U.S. Appl. No. 11/257,589 on Jul. 12, 2010; 9 pages.

Office Action issued in U.S. Appl. No. 11/257,589 on Oct. 28, 2010; 9 pages.

Chappell, David, "*Asynchronous Web Services and the Enterprise Service Bus*," May 6, 2002, 5 pgs. <http://www.webservices.org>, site visited Dec. 4, 2006.

Siekmann, Jörg et al., "Adaptive Course Generation and Presentation," ITS Workshop on Adaptive and Intelligent Web-Based Foundation System, Montreal, The Omega Group; pp. 1-10, 2000.

Lai Jin et al., "An Ontology-Aware Authoring Tool—Functional structure and guidance generation," Proceedings of AIED '99, pp. 85-92, LeManns France, 1999.

Dietrich, Albert et al., "Adaptive and Dynamic Hypertext Tutoring Systems Based on Knowledge Space Theory," AIED '97 Artificial Intelligence in Education, Amsterdam vol. 39 of Froulier in Artificial Intelligence and Application, 3 pgs., 1997.

Ranwez, Sylvie et al., "Description and Construction of Pedagogical Material using an Ontology based DTD," AIED '99 Workshop 2 proceedings "Ontologies for Intelligent Educational Systems", pp. 1-4, 1999.

Jungmann, Michael et al., "Adaptive Hypertext in Complex Information Spaces," Daimler-Benz Research & Technology, Technical University of Ilmenau, pp. 1-5, Mar. 8, 1997.

Henze, Nicola et al.,"Modeling Constructivist Teaching Functionality and Structure in the KBS Hyperbook System," University of Hannover, pp. 1-12, Jun. 4, 1999.

Mühlhäuser, Max, "Cooperative Computer-Aided Authoring and Learning," University of Karlsruhe, pp. 107-130, 145-161, 165-192, 273-291, 293-318, 1995.

Paaso, Professor Jouko, "A New Environment for Courseware Development, Course Delivery and Training," Proceedings of the ED-Media 97, Toronto, 1997, 10 pages.

Sun Microsystems, "Developing Web Services with Sun™ Open Network Environment," Mar. 2002, [online], [retrieved from the Internet Mar. 24, 2004: http:wwws.sun.com/software/sunone/wp-spine/spine.pdf], pp. 1-32, XP002274909.

Trythall, Steve, "JMS and CORBA Notification Interworking," Dec. 12, 2001, [online], [retrieved from the Internet Mar. 24, 2004: http://www.onjava.com/pub/a/onjava/2001/12/12/jms_not.html], 8 pgs., XP002274907.

Lipkin, Daniel, "Universal Learning Format Technical Specification," Jan. 13, 2001, retrieved from the Internet on Jul. 29, 2004, at http://xml.coverpages.org/ulf.html, XP002290517, pp. 1-3.

x.hlp, "Software for faster learning," http://www.xhlp.com/home.cfm, Apr. 2003, 7 pgs.

Global Knowledge Network, Inc., "On Demand Personal Navigator," http://kp.globalknowledge.com/products/od/index.asp, Sep. 2002, 2 pgs.

Hewlett Packard, "HP OpenView Integration Guide for Developers," Jul. 2002, [online], [retrieved from the Internet on Mar. 24, 2004: http://h21007.www2.hp.com/dspp/files/unprotected/OpenView/IntegrationGuide/OV_Integration—Guide_7_30.pdf], pp. 67-92, XP002274908.

Hewlett Packard, "hp OpenView Service Navigator for hp OpenView Operations 7.x for UNIX Product Brief," May 2002, [online], [retrieved from the Internet on Mar. 24, 2004: http://www.pervigil.com/PDF/HP/sernav_pb_jun02.pdf], 2 pgs., XP002274906.

Notice of Allowance issued in U.S. Appl. No. 11/258,591 on Sep. 17, 2008; 4 pages.

Advisory Action issued in U.S. Appl. No. 11/258,591 on Jun. 20, 2008; 3 pages.

Office Action issued in U.S. Appl. No. 11/258,591 on Mar. 26, 2008; 8 pages.

Office Action issued in U.S. Appl. No. 11/258,591 on Oct. 5, 2007; 8 pages.

Office Action issued in U.S. Appl. No. 11/301,595 on Jan. 25, 2010; 21 pages.

Office Action issued in U.S. Appl. No. 11/301,595 on Jun. 25, 2009; 13 pages.

Office Action issued in U.S. Appl. No. 11/257,587 on Mar. 4, 2010; 11 pages.

Office Action issued in U.S. Appl. No. 11/257,587 on Aug. 20, 2009; 9 pages.

Office Action issued in U.S. Appl. No. 11/257,587 on May 1, 2009; 8 pages.

Office Action issued in U.S. Appl. No. 11/257,587 on Dec. 1, 2008; 9 pages.

Office Action issued in U.S. Appl. No. 11/257,584 on Jan. 11, 2010; 6 pages.

Advisory Action issued in U.S. Appl. No. 11/257,584 on Oct. 19, 2009; 4 pages.

Office Action issued in U.S. Appl. No. 11/257,584 on Jul. 23, 2009; 10 pages.

Office Action issued in U.S. Appl. No. 11/257,584 on Jan. 27, 2009; 8 pages.

Advisory Action issued in U.S. Appl. No. 11/257,584 on Oct. 17, 2008; 3 pages.

Office Action issued in U.S. Appl. No. 11/257,584 on Jul. 23, 2008; 9 pages.

Office Action issued in U.S. Appl. No. 11/257,584 on Feb. 25, 2008; 8 pages.

Office Action issued in U.S. Appl. No. 11/258,520 on Nov. 30, 2009; 24 pages.

Advisory Action issued in U.S. Appl. No. 11/258,520 on Sep. 23, 2009; 3 pages.

Office Action issued in U.S. Appl. No. 11/258,520 on Jul. 22, 2009; 21pages.

Office Action issued in U.S. Appl. No. 11/258,520 on Jan. 14, 2009; 14 pages.

Office Action issued in U.S. Appl. No. 11/258,457 on Mar. 17, 2010; 7 pages.

Office Action issued in U.S. Appl. No. 11/258,457 on Dec. 24, 2008; 7 pages.

Office Action issued in U.S. Appl. No. 11/257,585 on Dec. 18, 2009; 10 pages.

Advisory Action issued in U.S. Appl. No. 11/257,585 on Sep. 23, 2009; 3 pages.

Office Action issued in U.S. Appl. No. 11/257,585 on Aug. 3, 2009; 12 pages.

Office Action issued in U.S. Appl. No. 11/257,585 on Jan. 28, 2009; 10 pages.

Advisory Action issued in U.S. Appl. No. 11/257,585 on Oct. 31, 2008; 3 pages.

Office Action issued in U.S. Appl. No. 11/257,585 on Sep. 5, 2008; 11 pages.

Office Action issued in U.S. Appl. No. 11/257,585 on Mar. 24, 2008; 8 pages.

Office Action issued in U.S. Appl. No. 11/257,589 on Jan. 7, 2010; 8 pages.

Advisory Action issued in U.S. Appl. No. 11/257,589 on Sep. 17, 2009; 3 pages.

Office Action issued in U.S. Appl. No. 11/257,589 on Jun. 26, 2009; 10 pages.

Advisory Action issued in U.S. Appl. No. 11/257,589 on Jun. 3, 2009; 3 pages.

Office Action issued in U.S. Appl. No. 11/257,589 on Apr. 3, 2009; 7 pages.

Office Action issued in U.S. Appl. No. 11/257,589 on Nov. 14, 2008; 9 pages.

Advisory Action issued in U.S. Appl. No. 11/374,497 on Apr. 8, 2009; 3 pages.

Office Action issued in U.S. Appl. No. 11/374,497 on Jan. 28, 2009; 13 pages.

Office Action issued in U.S. Appl. No. 11/374,497 on Sep. 3, 2008; 13 pages.

Cisco Systems; "Cisco System—Reusable Information Object Strategy Definition, Creation Overview, and Guidelines"; Version 3.0; Jun. 25, 1999.

Eugster, Patrick, et al., "*Distributed Asynchronous Collections: Abstractions for Publish/Subscribe Interaction*," XP-002171795, Agilent Laboratories, Edinburgh, Jan. 10, 2000, pp. 1-34.

Shiroshita, Teruji, et al., "*A Large-Scale Contents Distribution Architecture Based on Reliable Multicast*," XP 10365597, Proceedings Internet Workshop, 1999, IWS '99, Osaka, Japan, Feb. 18-20, 1999, pp. 75-80.

\* cited by examiner

DELTA VERSIONING FOR LEARNING OBJECTS

TECHNICAL FIELD

This disclosure relates to learning systems and, more specifically, to systems, methods, and software involving delta versioning for learning objects.

BACKGROUND

Today, an enterprise's survival in local or global markets at least partially depends on the knowledge and competencies of its employees, which may easily be considered a competitive factor for the enterprises (or other organizations). Shorter product life cycles and the speed with which the enterprise can react to changing market requirements are often important factors in competition and ones that underline the importance of being able to convey information on products and services to employees as swiftly as possible. Moreover, enterprise globalization and the resulting international competitive pressure are making rapid global knowledge transfer even more significant. Thus, enterprises are often faced with the challenge of lifelong learning to train a (perhaps globally) distributed workforce, update partners and suppliers about new products and developments, educate apprentices or new hires, or set up new markets. In other words, efficient and targeted learning is a challenge that learners, employees, and employers are equally faced with. But traditional classroom training typically ties up time and resources, takes employees away from their day-to-day tasks, and drives up expenses.

Electronic learning systems provide users with the ability to access course content directly from their computers, without the need for intermediaries such as teachers, tutors, and the like. Such systems have proven attractive for this reason (and perhaps others) and may include a master repository that stores existing versions of learning objects. Typically, each time a new version of an object is created, contained files are stored again even if the individual files have not changed. This often requires a large amount of storage required on the repository hardware and may also considerably slow down the storing of the objects.

SUMMARY

A method for versioning learning objects comprises identifying learning content, which includes a plurality of learning objects, for storage in a content repository. Each learning object comprises or contains at least one content file. The method then includes comparing first version information of a first of the content files to versioning information obtained from an object version file identifying a prior version of the particular learning object. In response to at least a portion of the first version information of the first content file matching a corresponding portion of the versioning information stored in the object version file, a pointer to a corresponding content file in the prior version of the learning object is stored in a new object version file.

In another embodiment, a method for managing versioned content files includes receiving a request for learning content from a user, with the learning content associated with a plurality of learning objects, each learning object comprising at least one content file, and at least a subset of the learning objects files being reusable for other learning content. The method further includes identifying a versioning object from a content repository based, at least in part, on a first learning object in the requested request. Next, a mapping table is generated from the versioning object, the table comprising a plurality of mapping entries, with each entry indicating a relative path for one of the plurality of content files. The method includes comparing a first content file in the first learning object to the mapping table. If a mapping entry is found for a particular requested content file, then the referenced file is collected using the relative path; but if no mapping is found for the particular requested content file, then the referenced file is collected from the versioning object.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
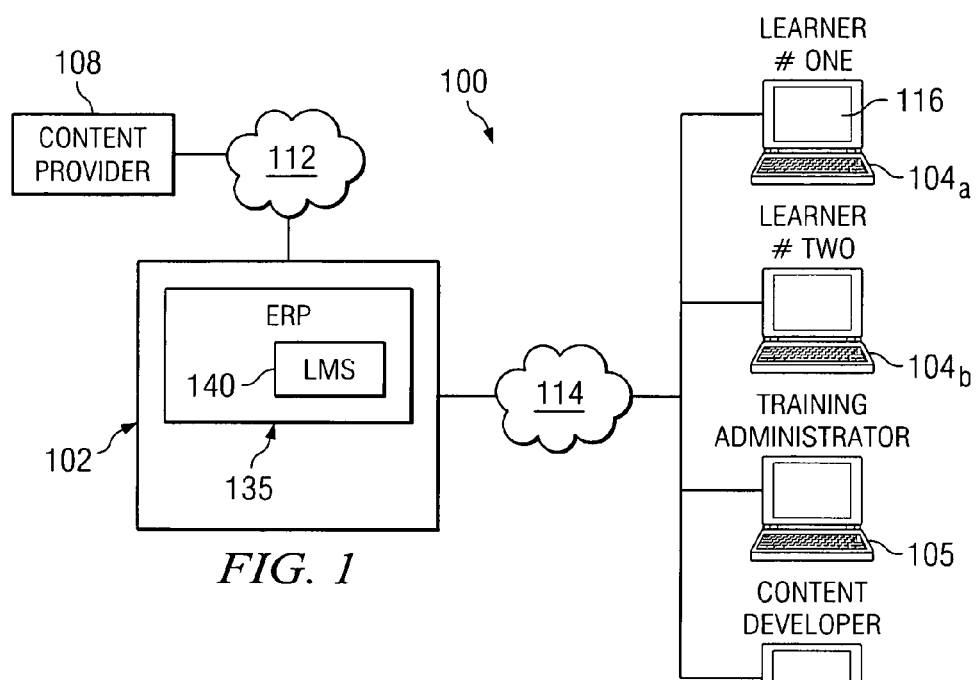
FIG. 1 is a diagram illustrating an example learning environment according to one embodiment of the present disclosure.

FIG. 1 illustrates an example environment for a learning management system 140 that may deliver a blended learning solution of learning methods used in traditional classroom training, web-based training, and virtual classrooms. At a high level, such applications 140 provide convenient information on the learner 104's virtual workplace and at least partially control the learning process itself. The system proposes learning units based on the learner 104's personal data, tracks progress through courses and coordinates the personalized learning experience. In addition, learning management system 140 encompasses the administrative side of the learning platform, where a training administrator 105 structures and updates the offering and distributes it among the target groups. Moreover, the course offering is usually not restricted to internally hosted content. The learning management system 140 often offers robust reporting capabilities, including ad hoc reporting and business intelligence. These capabilities may provide in-depth analysis of the entire business or organization, thereby enabling better decision making. Moreover, while implementing certain versioning techniques, learning management system 140 significantly improves the time and storage required for creating versions of particular learning objects, while maintaining the basic structure of the original format helping to ensure compatibility with other systems. More specifically, support for accessing delta versioned files may be transparent to the learner 104 via the existing client, such that applications reading the content can remain unchanged. Also the lookup for a referenced file is often fast and therefore the read performance may not be affected in any significant way.

Learning management system 140 also typically helps improve the quality of training and cut costs by reducing the travel and administrative costs associated with classroom training while delivering a consistent learning offering. Training administrators 105 may customize teaching scenarios by using web services to integrate external content, functions, and services into the learning platform from a remote or third party content provider 108. The training administrator 105 can administer internal and external participants (or learners 104) and enroll them for courses to be delivered via any number of techniques. Training management supports the respective organization, entity, or learner 104 in the day-to-day activities associated with course bookings. Booking activities can be performed by the training administrator in training management on an individual or group participant basis. For example, training administrator 105 can often request, execute, or otherwise manage the following activities in a dynamic participation menu presented in learning management system 140: i) prebook: if participants are interested in taking certain classroom courses or virtual classroom sessions, but there are no suitable dates scheduled, learners 104 can be prebooked for the course types. Prebooking data can be used to support a demand planning process; ii) book: individual or group learners 104 (for example, companies, departments, roles, or other organizational units) can be enrolled for courses that can be delivered using many technologies; iii) rebook: learners 104 can book a course on an earlier or later date than originally booked; iv) replace: learners 104 can be swapped; and v) cancel: course bookings can be canceled, for example, if the learners 104 cannot attend.

Environment 100 is typically a distributed client/server system that spans one or more networks such as external network 112 or internal network 114. In such embodiments, data may be communicated or stored in an encrypted format such as, for example, using the RSA, WEP, or DES encryption algorithms. But environment 100 may be in a dedicated enterprise environment—across a local area network or subnet—or any other suitable environment without departing from the scope of this disclosure. Indeed, while generally described or referenced in terms of an enterprise, the components and techniques may be implemented in any suitable environment, organization, entity, and such. Turning to the illustrated embodiment, environment 100 includes or is communicably coupled with server 102, one or more learners 104 or other users on clients, and network 112. In this embodiment, environment 100 is also communicably coupled with external content provider 108.

Server 102 comprises an electronic computing device operable to receive, transmit, process and store data associated with environment 100. Generally, FIG. 1 provides merely one example of computers that may be used with the disclosure. Each computer is generally intended to encompass any suitable processing device. For example, although FIG. 1 illustrates one server 102 that may be used with the disclosure, environment 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems. Server 102 may be adapted to execute any operating system including Linux, UNIX, Windows Server, or any other suitable operating system. According to one embodiment, server 102 may also include or be communicably coupled with a web server and/or a mail server. Server 102 may also be communicably coupled with a remote repository over a portion of network 112. While not illustrated, the repository may be any intra-enterprise, inter-enterprise, regional, nationwide, or other electronic storage facility, data processing center, or archive that allows for one or a plurality of clients (as well as servers 102) to dynamically store data elements, which may include any business, enterprise, application or other transaction data. For example, the repository may be a central database communicably coupled with one or more servers 102 and clients via a virtual private network (VPN), SSH (Secure Shell) tunnel, or other secure network connection. This repository may be physically or logically located at any appropriate location including in one of the example enterprises or off-shore, so long as it remains operable to store information associated with environment 100 and communicate such data to at least a subset of plurality of the clients (perhaps via server 102).

As a possible supplement to or as a portion of this repository, server 102 normally includes some form of local memory. The memory may include any memory or database module and may take the form of volatile or non-volatile memory including, without limitation, magnetic media, optical media, random access memory (RAM), read-only memory (ROM), removable media, or any other suitable local or remote memory component. For example, the memory may store or reference a large volume of information relevant to the planning, management, and follow-up of courses or other content. This example data includes information on i) course details, such as catalog information, dates, prices, capacity, time schedules, assignment of course content, and completion times; ii) personnel resources, such as trainers who are qualified to hold courses; iii) room details, such as addresses, capacity, and equipment; and iv) participant data for internal and external participants. The memory may also include any other appropriate data such as VPN applications or services, firewall policies, a security or access log, print or other reporting files, HTML files or templates, data classes or object interfaces, child software applications or sub-systems, and others. In some embodiments, the memory may store information as one or more tables in a relational database described in terms of SQL statements or scripts. In another embodiment, the memory may store information as various data structures in text files, eXtensible Markup Language (XML) documents, Virtual Storage Access Method (VSAM) files, flat files, Btrieve files, comma-separated-value (CSV) files, internal variables, or one or more libraries. But any stored information may comprise one table or file or a plurality of tables or files stored on one computer or across a plurality of computers in any appropriate format. Indeed, some or all of the learning or content data may be local or remote without departing from the scope of this disclosure and store any type of appropriate data.

Server 102 also includes one or more processors. Each processor executes instructions and manipulates data to perform the operations of server 102 such as, for example, a central processing unit (CPU), a blade, an application specific integrated circuit (ASIC), or a field-programmable gate array (FPGA). Although this disclosure typically discusses computers in terms of a single processor, multiple processors may be used according to particular needs and reference to one processor is meant to include multiple processors where applicable. In the illustrated embodiment, the processor executes enterprise resource planning (ERP) solution 135, thereby providing organizations with the strategic insight, ability to differentiate, increased productivity, and flexibility they need to succeed. With software such as ERP solution 135, the implementing entity may automate end-to-end processes and extend those processes beyond the particular organization to the entire system by incorporating customers, partners, suppliers, or other entities. For example, ERP solution 135 may include or implement easy-to-use self-services and role-based access to information and services for certain users, thereby possibly boosting productivity and efficiency. In another example, ERP solution 135 may include or implement analytics that enable the particular entity or user to evaluate performance and analyze operations, workforce, and financials on an entity and individual level for strategic and operational insight. ERP solution 135 may further include or implement i) financials to control corporate finance functions while providing support for compliance to rigorous regulatory mandates; ii) operations to support end-to-end logistics for complete business cycles and capabilities that improve product quality, costs, and time to market; and/or iii) corporate services to optimize both centralized and decentralized services for managing real estate, project portfolios, business travel, environment, health and safety, and quality. In the illustrated embodiment, ERP solution 135 also includes or implements some form of human capital management (in this case, learning) to maximize the profitability or other measurable potential of the users, with support for talent management, workforce deployment, and workforce process management. In certain cases, ERP solution 135 may be a composite application that includes, execute, or otherwise implement some or all of the foregoing aspects, which include learning management system 140 as illustrated.

As briefly described above, learning management system 140 is any software operable to provide a comprehensive enterprise learning platform capable of managing and integrating business and learning processes and supporting all methods of learning, not restricted to e-learning or classroom training. As described in more detail in FIG. 2, learning management system 140 is often fully integrated with ERP solution 135 and includes an intuitive learning portal and a powerful training and learning management system, as well as content authoring, structuring, and management capabilities. Learning management system 140 offers back-office functionality for competency management and comprehensive assessment for performance management, and offers strong analytical capabilities, including support for ad hoc reporting. The solution uses a comprehensive learning approach to deliver knowledge to all stakeholders, and tailors learning paths to an individual's educational needs and personal learning style. Interactive learning units can be created with a training simulation tool that is also available.

Regardless of the particular implementation, "software" may include software, firmware, wired or programmed hardware, or any combination thereof as appropriate.

Indeed, ERP solution 135 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while ERP solution 135 is illustrated in FIG. 1 as including one sub-module learning management system 140, ERP solution 135 may include numerous other sub-modules or may instead be a single multi-tasked module that implements the various features and functionality through various objects, methods, or other processes. Further, while illustrated as internal to server 102, one or more processes associated with ERP solution 135 may be stored, referenced, or executed remotely. For example, a portion of ERP solution 135 may be a web service that is remotely called, while another portion of ERP solution 135 may be an interface object bundled for processing at the remote client. Moreover, ERP solution 135 and/or learning management system 140 may be a child or sub-module of another software module or enterprise application (not illustrated) without departing from the scope of this disclosure.

Server 102 may also include an interface for communicating with other computer systems, such as the clients, over networks, such as 112 or 114, in a client-server or other distributed environment. In certain embodiments, server 102 receives data from internal or external senders through the interface for storage in the memory and/or processing by the processor. Generally, the interface comprises logic encoded in software and/or hardware in a suitable combination and operable to communicate with networks 112 or 114. More specifically, the interface may comprise software supporting one or more communications protocols associated with communications network 112 or hardware operable to communicate physical signals.

Network 112 facilitates wireless or wireline communication between computer server 102 and any other local or remote computers, such as clients. Network 112, as well as network 114, facilitates wireless or wireline communication between computer server 102 and any other local or remote computer, such as local or remote clients or a remote content provider 108. While the following is a description of network 112, the description may also apply to network 114, where appropriate. For example, while illustrated as separate networks, network 112 and network 114 may be a continuous network logically divided into various sub-nets or virtual networks without departing from the scope of this disclosure. In some embodiments, network 112 includes access points that are responsible for brokering exchange of information between the clients. As discussed above, access points may comprise conventional access points, wireless security gateways, bridges, wireless switches, sensors, or any other suitable device operable to receive and/or transmit wireless signals. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more local area networks (LANs), radio access networks (RANs), metropolitan area networks (MANs), wide area networks (WANs), all or a portion of the global computer network known as the Internet, and/or any other communication system or systems at one or more locations. Turning to network 114, as illustrated, it may be all or a portion of an enterprise or secured network. In another example, network 114 may be a VPN between server 102 and a particular client across wireline or wireless links. In certain embodiments, network 114 may be a secure network associated with the enterprise and certain local or remote clients.

Each client is any computing device operable to connect or communicate with server 102 or other portions of the network using any communication link. At a high level, each client includes or executes at least GUI 116 and comprises an electronic computing device operable to receive, transmit, process and store any appropriate data associated with environment 100. It will be understood that there may be any number of clients communicably coupled to server 102. Further, "client" and "learner," "administrator," "developer," and "user" may be used interchangeably as appropriate without departing from the scope of this disclosure. Moreover, for ease of illustration, each client is described in terms of being used by one user. But this disclosure contemplates that many users may use one computer or that one user may use multiple computers. As used in this disclosure, the client is intended to encompass a personal computer, touch screen terminal, workstation, network computer, kiosk, wireless data port, smart phone, personal data assistant (PDA), one or more processors within these or other devices, or any other suitable processing device or computer. For example, the client may be a PDA operable to wirelessly connect with external or unsecured network. In another example, the client may comprise a laptop that includes an input device, such as a keypad, touch screen, mouse, or other device that can accept information, and an output device that conveys information associated with the operation of server 102 or other clients, including digital data, visual information, or GUI 116. Both the input device and output device may include fixed or removable storage media such as a magnetic computer disk, CD-ROM, or other suitable media to both receive input from and provide output to users of the clients through the display, namely the client portion of GUI or application interface 116.

GUI 116 comprises a graphical user interface operable to allow the user of the client to interface with at least a portion of environment 100 for any suitable purpose, such as viewing application or other transaction data. Generally, GUI 116 provides the particular user with an efficient and user-friendly presentation of data provided by or communicated within environment 100. As shown in later FIGs, GUI 116 may comprise a plurality of customizable frames or views having interactive fields, pull-down lists, and buttons operated by the user. GUI 116 may be a learning interface allowing the user or learner 104 to search a course catalog, book and cancel course participation, and support individual course planning (e.g., by determining qualification deficits and displaying a learner's completed, started, and planned training activities). Learner 104 also may access and work through web based courses using the learning interface. The learning interface may be used to start a course, reenter a course, exit a course, and take tests. The learning interface also provides messages, notes, and special course offerings to the learner 104. GUI 116 may also be a course editor allowing the content developer to create the structure for the course content, which may be associated with certain metadata. The metadata may be interpreted by a content player of learning management system 140 (described below) to present a course to learner 104 according to a learning strategy selected at run time. In particular, the course editor may enable the author or content developer 106 to classify and describe structural elements, assign attributes to structural elements, assign relations between structural elements, and build a subject-taxonomic course structure. The course editor generates the structure of the course and may include a menu bar, a button bar, a course overview, a dialog box, and work space. The menu bar may include various drop-down menus, such as, for example, file, edit, tools, options, and help. The drop-down menus may include functions, such as create a new course, open an existing course, edit a course, or save a course. The button bar may include a number of buttons. The buttons may be shortcuts to functions in the drop down menus that are used frequently and that activate tools and functions for use with the course editor. The remaining portions of the example course editor interface may be divided in to three primary sections or windows: a course overview, a dialog box, and a workspace. Each of the sections may be provided with horizontal or vertical scroll bars or other means allowing the windows to be sized to fit on different displays while providing access to elements that may not appear in the window.

GUI 116 may also present a plurality of portals or dashboards. For example, GUI 116 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by presentation elements 140. GUI 116 is often configurable, supporting a combination of tables and graphs (bar, line, pie, status dials, etc.), and is able to build real-time dashboards, where presentation elements 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 116 may indicate a reference to the front-end or other component of learning management system 140, as well as the particular interface or learning portal accessible via the client, as appropriate, without departing from the scope of this disclosure. In short, GUI 116 contemplates any graphical user interface, such as a generic web browser or touch screen, that processes information in environment 100 and efficiently presents the results to the user. Server 102 can accept data from the client via the web browser (e.g., Microsoft Internet Explorer or Netscape Navigator) and return the appropriate HTML or XML responses to the browser using network 112 or 114, such as those illustrated in subsequent FIGs.

Figure 2:
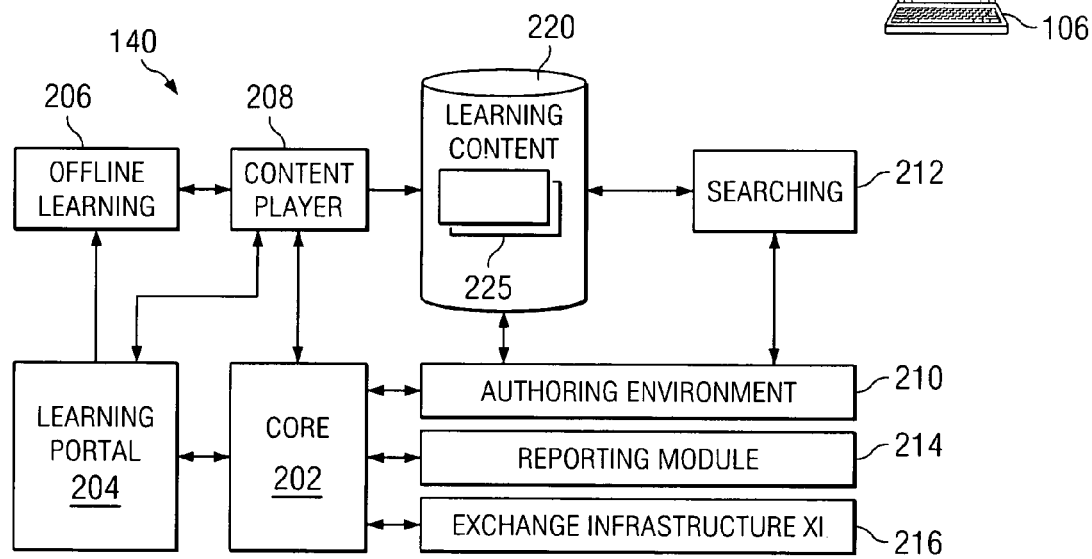
FIG. 2 illustrates an example architecture of a learning management system implemented within the learning environment of FIG. 1.

FIG. 2 illustrates one example implementation of learning management system (LMS) 140. In the illustrated embodiment, LMS 140 comprises four example components, namely i) a management system core 202, which controls learning processes and manages and handles the administrative side of training; ii) a learning portal 204, which is the learner's springboard into the learning environment, which allows him to access the course offering and information on personal learning data and learning activities; iii) an authoring environment 210, where learning content and tests are designed and structured; and iv) a content management system 220, where learning content is stored and managed. Generally, LMS 140 is aimed at learners 104, trainers 105, course authors 106 and instructional designers, administrators, and managers.

Learners 104 log on to their personalized learning portal 204 from any suitable client via GUI 116. The learning portal 204 is the user's personalized point of access to the learning-related functions. Generally, learning portal 204 presents details of the complete education and training offering, such as traditional classroom training, e-learning courses (such as virtual classroom sessions or web-based training), or extensive curricula. Self-service applications enable learners 104 to enroll themselves for courses, prebook for classroom courses, and cancel bookings for delivery methods, as well as start self-paced learning units directly. If learner 104 wants to continue learning offline, he can often download the courses onto the client and synchronize the learning progress later. The learning portal 204 may be seamlessly integrated in an enterprise portal, where learner 104 is provided with access to a wide range of functions via one system. Such an enterprise portal may be the learner's single point of entry and may integrate a large number of role-based functions, which are presented to the user in a clear, intuitive structure. The learning portal 204 often gives learner 104 access to functions such as, for example, search for courses using i) find functions: finding courses in the course catalog that have keywords in the course title or description; and ii) extended search functions: using the attributes appended to courses, such as target group, prerequisites, qualifications imparted, or delivery method. Additional functions may include self-service applications for booking courses and canceling bookings, messages and notes, course appraisals, and special (or personalized) course offering including courses prescribed for the learner 104 on the basis of his or her role in the enterprise or the wishes of the respective supervisor or trainer and qualification deficits of learner 104 that can be reduced or eliminated by participating in the relevant courses. The learning portal 204 may also provide a view of current and planned training activities, as well as access to courses booked, including: i) starting a course; ii) reentering an interrupted course; iii) downloading a course and continuing learning offline; iv) going online again with a downloaded course and synchronizing the learning progress; v) exiting a course; and vi) taking a test.

On the basis of the information the learning management system 140 has about learner 104, the learning management system core 202 proposes learning units for the learner 104, monitors the learner's progress, and coordinates the learner's personal learning process. In addition, the learning management system core 202 is often responsible for managing and handling the administrative processes. Targeted knowledge transfer may use precise matching of the learning objectives and qualifications of a learning unit with the learner's level of knowledge. For example, at the start of a course, the management system core 202 may compare learning objectives already attained by the respective learner 104 with the learning objectives of the course. On the basis of this, core 202 determines the learner's current level and the required content and scope of the course. The resulting course is then presented to the learner 104 via a content player 208.

The content player 208 is a virtual teacher that tailors learning content to the needs of the individual learner 104 and helps him navigate through the course; content player 208 then presents the learning course to the learner 104. In certain embodiments, the content player 208 is a Java application that is deployed on a Java runtime environment, such as J2EE. In this case, it is typically linked with other systems (such as, a web application server, ERP solution 135, and content 220) via the Java Connector. The individual course navigation may be set up at runtime on the basis of the learning strategy stored in the learner account. Using the didactical strategies, content player 208 helps ensure that the course is dynamically adapted to the individual learning situation and the preferences expressed by learner 104. At this point, the content player 208 then calculates dynamically adjusted learning paths and presents these to the learner 104—perhaps graphically—to facilitate orientation within a complex subject area. The learner 104 can resume working on an interrupted course at any time. At this point, the content player 208 guides the learner 104 to the spot at which training was interrupted.

Offline learning player 206 generally enables learners 104 to download network or other web-based courses via the learning portal 204 and play them locally. Locally stored courses are listed in the course list with an icon indicating the status of each course. The offline player 206 may guide the learner 104 through the course according to the preferred learning strategy. It may also dynamically adjust the number and sequence of learning objects to the learner's individual learning pattern. If the learner 104 interrupts a course, the offline player 206 reenters the course at the point of interruption the next time. The learner 104 can, at any point in time, resynchronize his offline learning progress with the learning portal 204 and either continue learning online or set the course to a completed status.

LMS core 202 may also include or invoke training management that would be an administrative side of LMS 140. This typically includes course planning and execution, booking and cancellation of course participation, and follow-up processing, including cost settlement. In training management, the training administrator 105 creates the course offering and can, for example, define training measures for individual learners 104 and groups of learners 104. The training administrator 105 creates the course catalog in training management and makes it available (partially or completely) to learners 104 in the learning portal 204 for reference and enrollment purposes. The training administrator 105 can typically administer internal and external participants and enroll them for courses to be delivered using various technologies and techniques. Training management supports numerous business processes involved in the organization, management, and handling of training. Training management can be configured to meet the requirements, work processes, and delivery methods common in the enterprise. Training measures are usually flexibly structured and may include briefings, seminars, workshops, virtual classroom sessions, web-based trainings, external web-based trainings, static web courses, or curricula. Training management includes functions to efficiently create the course offerings. Using course groups to categorize topics by subject area enables flexible structuring of the course catalog. For example, when training administrator 105 creates a new subject area represented by a course group, he can decide whether it should be accessible to learners 104 in the learning portal 202.

Reporting functions 214 in training management enable managers to keep track of learners' learning activities and the associated costs at all times. Supervisors or managers can monitor and steer the learning processes of their employees. They can be notified when their employees request participation or cancellation in courses and can approve or reject these requests. LMS 140 may provide the training manager with extensive support for the planning, organization, and controlling of corporate education and training. Trainers need to have up-to-the-minute, reliable information about their course schedules. There is a wide range of reporting options available in training management to enable the trainer to keep track of participants, rooms, course locations, and so on.

Authoring environment 210 contains tools and wizards that content developers 106 and instructional designers can use to create or import external course content. Content developers 106 often incorporate the roles of instructional designer and subject matter expert. For example, the instructional designer, as the methodological-didactical expert, may be responsible for designing course structures in line with specific guidelines. The example subject matter expert may be responsible for creating instructional content according to the specifications of the instructional designer. External authoring tools can be launched directly via authoring environment 210 to create learning content that can be integrated into learning objects and combined to create complete courses (learning nets). Attributes may be appended to content, thereby allowing learners 104 to structure learning content more flexibly depending on the learning strategy they prefer. Customizable and flexible views allow subject matter experts and instructional designers to configure and personalize the authoring environment 210. To create the HTML pages for the content, the user can easily and seamlessly integrate editors from external providers or other content providers 108 into LMS 140 and launch the editors directly from authoring environment 210. Authoring environment 210 often includes a number of tools for creating, structuring, and publishing course content and tests to facilitate and optimize the work of instructional designers, subject matter experts, and training administrators 105. Authoring environment 210 may contain any number of components or sub-modules such as an instructional design editor is used by instructional designers and subject matter experts to create and structure learning content (learning nets and learning objects), a test author is used by instructional designers and subject matter experts to create web-based tests, and a repository explorer is for training administrators and instructional designers to manage content.

In the illustrated embodiment, course content is stored and managed in content management system 220. Put another way, LMS 140 typically uses the content management system 220 as its content storage location for content or learning objects valid through environment 100. But a WebDAV (Web-based Distributed Authoring and Versioning) interface (or other HTTP extension) allows integration of other WebDAV-enabled storage facilities as well without departing from the scope of this disclosure. Regardless of the particular technology, content management system 220 includes a master content repository. This master content repository, also referred to herein as the "master repository," stores the learning objects described above, which are used to present a course to learner 104. The master repository may also store version objects 225, described in more detail below. Content authors or developers 106 publish content from their respective local repository (often the memory in the particular client) to the master repository. The master and local repositories may be managed via a computer program known as the repository explorer or another similar interface in authoring environment 210. The example repository explorer may be run on the client of developer 106 and may communicate with both the local repository and the master repository. This repository explorer may includes a window or frame that displays a list of objects, along with component files, stored in the local repository and another window or that displays a list of objects stored in the master repository. Links to this content may assist the training administrator 105 in retrieving suitable course content when planning web-based courses.

A training management component of LMS 140 may help the training administrator 105 plan and create the course offering; manage participation, resources, and courses; and perform reporting. When planning e-learning courses, the training administrator 105 uses references inserted in published courses to retrieve the appropriate content in the content management system for the courses being planned. Content management system 220 may also include or implement content conversion, import, and export functions, allowing easy integration of Sharable Content Object Reference Model (SCORM)-compliant courses from external providers or other content providers 108. Customers can create and save their own templates for the various learning elements (learning objects, tests, and so on) that define structural and content-related specifications. These provide authors with valuable methodological and didactical support.

Figure 3:
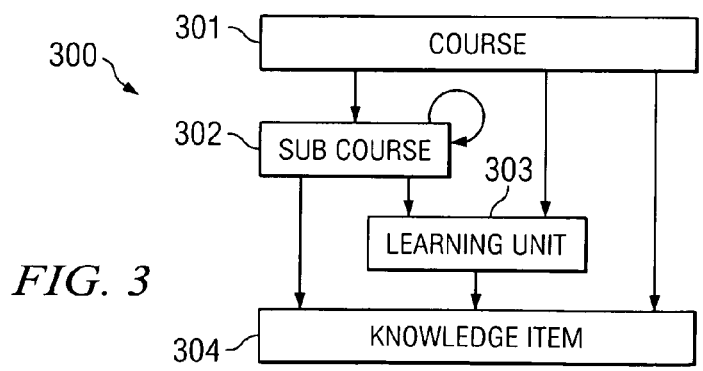
FIG. 3 illustrates an example content aggregation model in the learning management system.

LMS 140 and its implemented methodology typically structure content so that the content is reusable and flexible. For example, the content structure allows the creator of a course to reuse existing content to create new or additional courses. In addition, the content structure provides flexible content delivery that may be adapted to the learning styles of different learners. E-learning content may be aggregated using a number of structural elements arranged at different aggregation levels. Each higher level structural element may refer to any instances of all structural elements of a lower level. At its lowest level, a structural element refers to content and may not be further divided. According to one implementation shown in FIG. 3, course material 300 may be divided into four structural elements: a course 301, a sub-course 302, a learning unit 303, and a knowledge item 304.

Starting from the lowest level, knowledge items 304 are the basis for the other structural elements and are the building blocks of the course content structure. Each knowledge item 304 may include content that illustrates, explains, practices, or tests an aspect of a thematic area or topic. Knowledge items 304 typically are small in size (i.e., of short duration, e.g., approximately five minutes or less). Any number of attributes may be used to describe a particular knowledge item 304 such as, for example, a name, a type of media, and a type of knowledge. The name may be used by a learning system to identify and locate the content associated with a knowledge item 304. The type of media describes the form of the content that is associated with the knowledge item 304. For example, media types include a presentation type, a communication type, and an interactive type. A presentation media type may include a text, a table, an illustration, a graphic, an image, an animation, an audio clip, and a video clip. A communication media type may include a chat session, a group (e.g., a newsgroup, a team, a class, and a group of peers), an email, a short message service (SMS), and an instant message. An interactive media type may include a computer based training, a simulation, and a test.

Knowledge item 304 also may be described by the attribute of knowledge type. For example, knowledge types include knowledge of orientation, knowledge of action, knowledge of explanation, and knowledge of source/reference. Knowledge types may differ in learning goal and content. For example, knowledge of orientation offers a point of reference to the learner, and, therefore, provides general information for a better understanding of the structure of interrelated structural elements. Each of the knowledge types are described in further detail below.

Knowledge items 304 may be generated using a wide range of technologies, often allowing a browser (including plug-in applications) to be able to interpret and display the appropriate file formats associated with each knowledge item. For example, markup languages (such as HTML, a standard generalized markup language (SGML), a dynamic HTML (DHTML), or XML), JavaScript (a client-side scripting language), and/or Flash may be used to create knowledge items 304. HTML may be used to describe the logical elements and presentation of a document, such as, for example, text, headings, paragraphs, lists, tables, or image references. Flash may be used as a file format for Flash movies and as a plug-in for playing Flash files in a browser. For example, Flash movies using vector and bitmap graphics, animations, transparencies, transitions, MP3 audio files, input forms, and interactions may be used. In addition, Flash allows a pixel-precise positioning of graphical elements to generate impressive and interactive applications for presentation of course material to a learner.

Learning units 303 may be assembled using one or more knowledge items 304 to represent, for example, a distinct, thematically-coherent unit. Consequently, learning units 303 may be considered containers for knowledge items 304 of the same topic. Learning units 303 also may be considered relatively small in size (i.e., duration) though larger than a knowledge item 304.

Sub-courses 302 may be assembled using other sub-courses 302, learning units 303, and/or knowledge items 304. The sub-course 302 may be used to split up an extensive course into several smaller subordinate courses. Sub-courses 302 may be used to build an arbitrarily deep nested structure by referring to other sub-courses 302.

Courses may be assembled from all of the subordinate structural elements including sub-courses 302, learning units 303, and knowledge items 304. To foster maximum reuse, all structural elements should be self-contained and context free.

Structural elements also may be tagged with metadata that is used to support adaptive delivery, reusability, and search/retrieval of content associated with the structural elements. For example, learning object metadata (LOM), per maps defined by the IEEE "Learning Object Metadata Working Group," may be attached to individual course structure elements. The metadata may be used to indicate learner competencies associated with the structural elements. Other metadata may include a number of knowledge types (e.g., orientation, action, explanation, and resources) that may be used to categorize structural elements.

Figure 4:
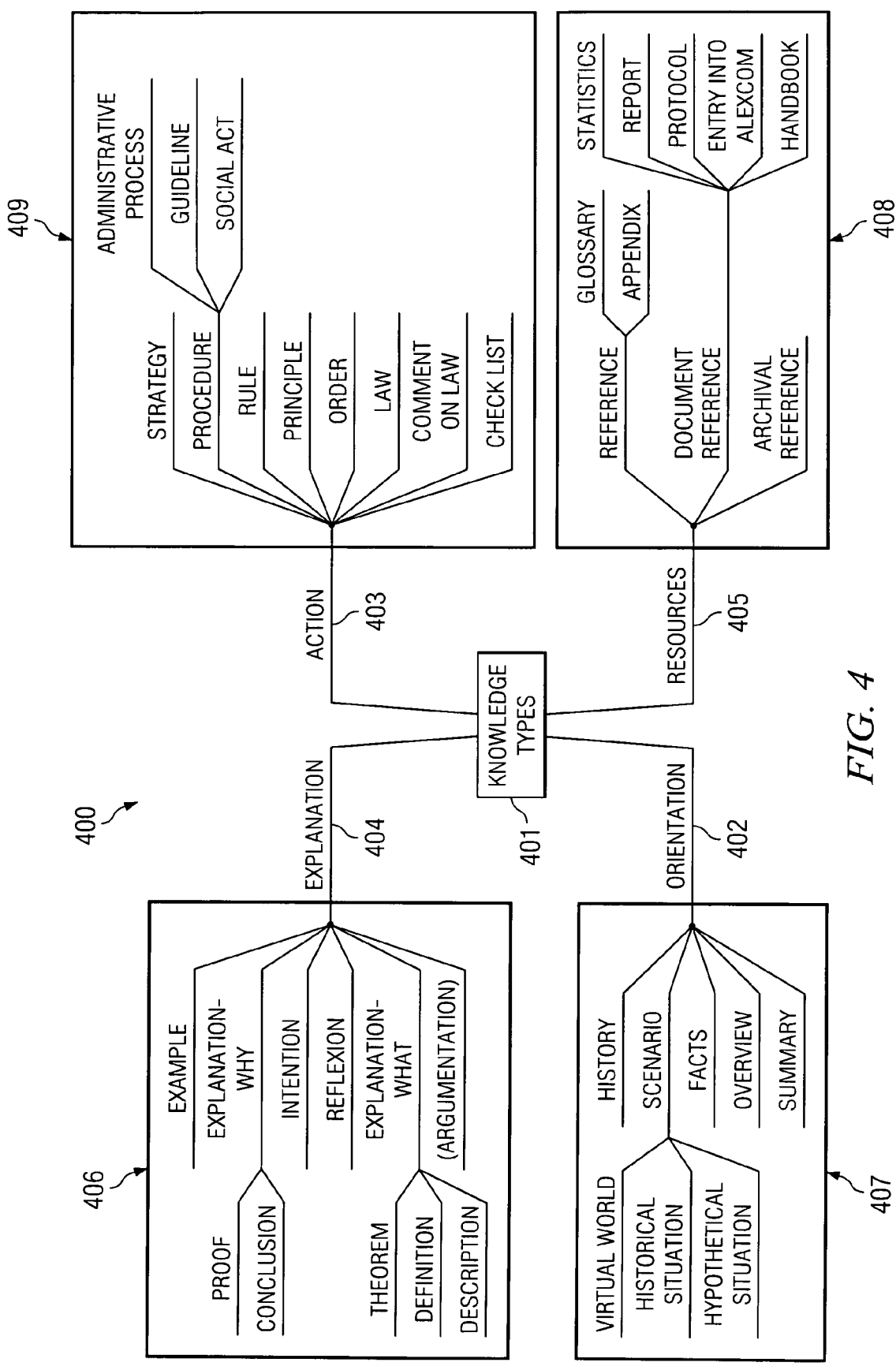
FIG. 4 is an example of one possible ontology of knowledge types used in the learning management system.

As shown in FIG. 4, structural elements may be categorized using a didactical ontology 400 of knowledge types 401 that includes orientation knowledge 402, action knowledge 403, explanation knowledge 404, and resource knowledge 405. Orientation knowledge 402 helps a learner 104 to find their way through a topic without being able to act in a topic-specific manner and may be referred to as "know what." Action knowledge 403 helps a learner to acquire topic related skills and may be referred to as "know how." Explanation knowledge 404 provides a learner with an explanation of why something is the way it is and may be referred to as "know why." Resource knowledge 405 teaches a learner where to find additional information on a specific topic and may be referred to as "know where."

The four knowledge types (orientation, action, explanation, and reference) may be further divided into a fine grained ontology. For example, orientation knowledge 402 may refer to sub-types 407 that include a history, a scenario, a fact, an overview, and a summary. Action knowledge 403 may refer to sub-types 409 that include a strategy, a procedure, a rule, a principle, an order, a law, a comment on law, and a checklist. Explanation knowledge 404 may refer to sub-types 406 that include an example, an intention, a reflection, an explanation of why or what, and an argumentation. Resource knowledge 405 may refer to sub-types 408 that include a reference, a document reference, and an archival reference.

Dependencies between structural elements may be described by relations when assembling the structural elements at one aggregation level. A relation may be used to describe the natural, subject-taxonomic relation between the structural elements. A relation may be directional or non-directional. A directional relation may be used to indicate that the relation between structural elements is true only in one direction. Directional relations should be followed. Relations may be divided into two categories: subject-taxonomic and non-subject taxonomic.

Subject-taxonomic relations may be further divided into hierarchical relations and associative relations. Hierarchical relations may be used to express a relation between structural elements that have a relation of subordination or superordination. For example, a hierarchical relation between the knowledge items A and B exists if B is part of A. Hierarchical relations may be divided into two categories: the part/whole relation (i.e., "has part") and the abstraction relation (i.e., "generalizes"). For example, the part/whole relation "A has part B" describes that B is part of A. The abstraction relation "A generalizes B" implies that B is a specific type of A (e.g., an aircraft generalizes a jet or a jet is a specific type of aircraft).

Associative relations may be used refer to a kind of relation of relevancy between two structural elements. Associative relations may help a learner obtain a better understanding of facts associated with the structural elements. Associative relations describe a manifold relation between two structural elements and are mainly directional (i.e., the relation between structural elements is true only in one direction). Examples of associative relations include "determines," "side-by-side," "alternative to," "opposite to," "precedes," "context of," "process of," "values," "means of," and "affinity."

The "determines" relation describes a deterministic correlation between A and B (e.g., B causally depends on A). The "side-by-side" relation may be viewed from a spatial, conceptual, theoretical, or ontological perspective (e.g., A side-by-side with B is valid if both knowledge objects are part of a superordinate whole). The side-by-side relation may be subdivided into relations, such as "similar to," "alternative to," and "analogous to." The "opposite to" relation implies that two structural elements are opposite in reference to at least one quality. The "precedes" relation describes a temporal relationship of succession (e.g., A occurs in time before B (and not that A is a prerequisite of B). The "context of" relation describes the factual and situational relationship on a basis of which one of the related structural elements may be derived. An "affinity" between structural elements suggests that there is a close functional correlation between the structural elements (e.g., there is an affinity between books and the act of reading because reading is the main function of books).

Non Subject-Taxonomic relations may include the relations "prerequisite of" and "belongs to." The "prerequisite of" and the "belongs to" relations do not refer to the subject-taxonomic interrelations of the knowledge to be imparted. Instead, these relations refer to the progression of the course in the learning environment (e.g., as the learner traverses the course). The "prerequisite of" relation is directional whereas the "belongs to" relation is non-directional. Both relations may be used for knowledge items 304 that cannot be further subdivided. For example, if the size of the screen is too small to display the entire content on one page, the page displaying the content may be split into two pages that are connected by the relation "prerequisite of."

Another type of metadata is competencies. Competencies may be assigned to structural elements, such as, for example, a sub-course 302 or a learning unit 303. The competencies may be used to indicate and evaluate the performance of a learner as learner 104 traverses the course material. A competency may be classified as a cognitive skill, an emotional skill, a senso-motorical skill, or a social skill.

Figure 5A:
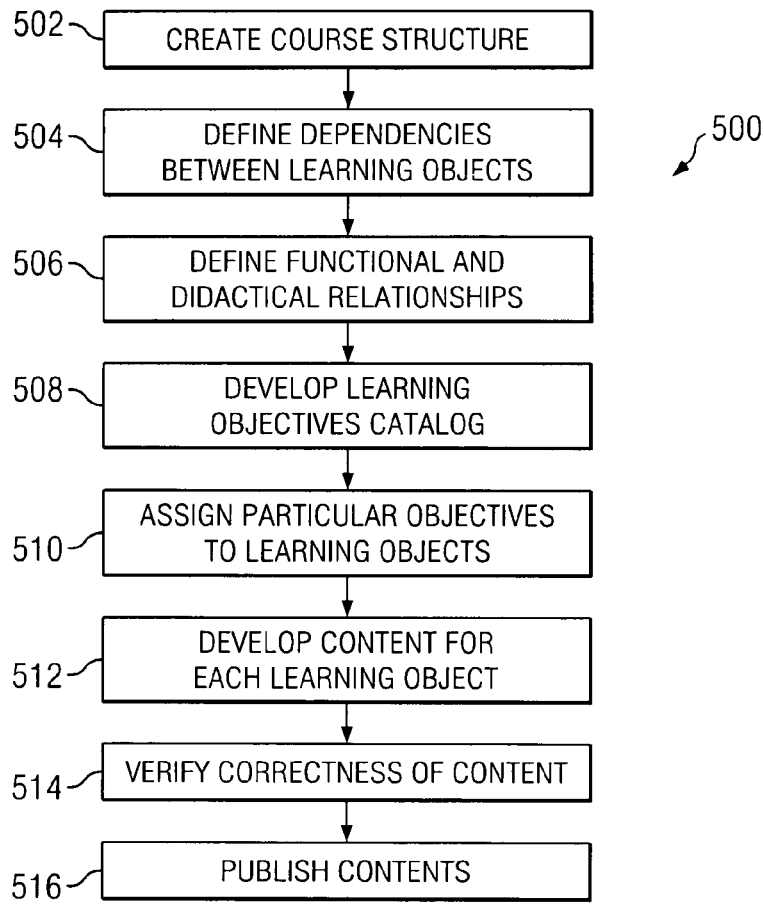
FIGS. 5A-B are flow diagrams illustrating example methods for developing content for use by at least a portion of the learning environment of FIG. 1.
Figure 5B:
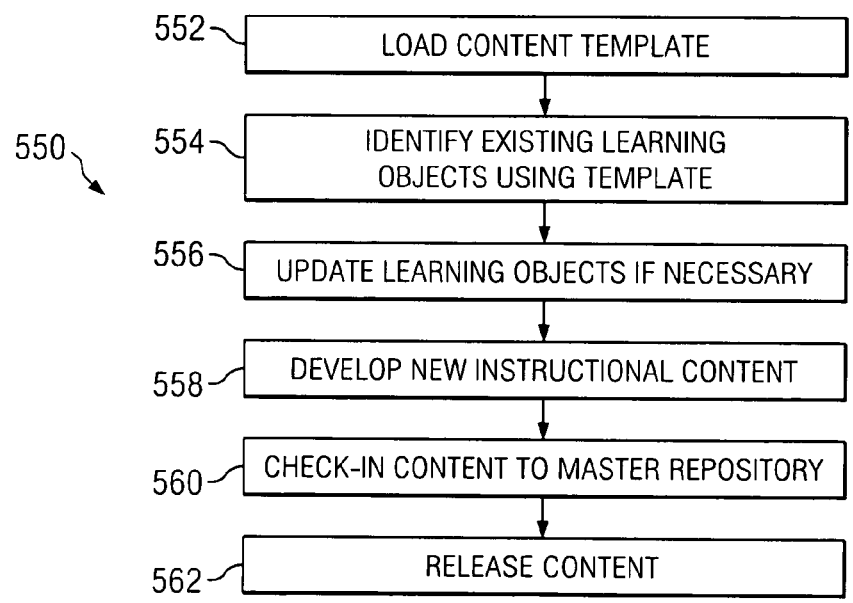

FIGS. 5A-B are flowcharts illustrating example methods, 500 and 550 respectively, for developing content in accordance with certain embodiments of the present disclosure. Generally, learning content includes a plurality of learning objects. Each learning object may be considered a container of (physically or logically) associated content files such as, for example, one or more web pages with images used in the page. The following description focuses on the operation of a developer 106 using learning management system 140 and such learning objects and content files to perform this method. But environment 100 contemplates using any appropriate combination and arrangement of logical elements implementing some or all of the described functionality.

As shown in FIG. 5A, a content developer 106 may use all or a portion of LMS 140 (such as authoring environment 210) to develop new or updated content as illustrated by example method 500. For example, method 500 begins at step 502, where content developer 106 creates a course structure, often according to prescribed standards and guidelines. Next, developer 106 defines dependencies between individual objects at step 504 and creates the relevant functional and didactical relationships at step 506. Developer 106 may develop, as illustrated at step 508, a learning objectives catalog, one or more elements of which he then assigns to the appropriate learning objects at step 510. Then at step 512, and as described in more example detail in FIG. 5B, developer 106 develops the particular content for each object within the course structure. Such content may include web pages, images, Flash or other media, or any other data to be stored in content files. Of course, developer 106 may manage or work with other developers 106 (or 108) to develop some or all of the individual content. In this case, the particular developer 106 may specify that content is to be created by particular authors and may, also or in combination, have a coordinating function in the content creation process. This would be typically required when there are several subject matter experts involved in one course structure. Developer 106 may further be responsible for deadline and schedule monitoring. Once the content is suitably developed, he may verify that the structures are complete, that they are didactically correct, or perform any other appropriate verification or authentication at step 514. For example, developer 106 may also check the metadata and the learning objectives. Upon completion, developer 106 publishes the (typically whole) learning net in the master repository, where it is available to training administrators 105 at step 516.

FIG. 5B provides one example technique, via method 550, for specifically developing content for a learning course. In this method 500, developer 106 may (or may not) load a content template at step 552. In this case, developer 106 attempts to create instructional content, stored in content files, in close cooperation with the instructional designer using the prescribed templates. Regardless, developer 106 may identify at step 554 existing learning objects in the master repository (or content repository 220) that can be used or converted for the existing project. If necessary or desired, develop 106 may update one, some, or all of these existing learning objects (as well as individual content files) to make them more suitable for the particular course at step 556. Next, at step 558, developer 106 develops new content or content files using any appropriate editor or other program. Then, in steps 560 and 562, developer 106 makes finished content (learning net, learning object, or media object) available to other authors 106 and administrators 105. This typically involves checking in the content into the master repository and releasing or publishing the content. Of course, other authors can then subsequently reuse this content by copying it or creating references to it.

As described above, existing learning objects may be revised and/or combined to create new versions of existing objects. "Version," in this context, is generally a learning object that is derived from, or based on, another learning object. The process of creating new versions of existing learning objects is commonly called "versioning." In general, other versioning systems used in traditional (learning) applications may only one currently valid configuration. That is, such applications typically have a single version of each object for use in the application. By contrast, in LMS 140, different versions of the same object can be used at the same time. Each object version "knows" on what other object versions it depends, which promotes consistency throughout the LMS 140. Such knowledge typically arises in terms of a versioning object. Each versioning object contains multiple content files (in some cases several thousand) that can represent a single page, a chapter, or a complete course depending on the granularity used when building the course. Regardless of the particular granularity used, each versioning object may be treated as a single object; therefore, an operation performed on the object is usually performed on all component files.

In regard to the content files, delta versioning is used by LMS 140 to save learning objects that have actually been changed into new object versions, while at least attempting to ignore or reduce processing of unchanged content files within the learning objects. Typically, content files that are identical to (or substantially match) the precursor versions are only referenced in subsequent versioning objects. In certain embodiments, delta versioning is only be used for reusable learning objects. As described below for GUI 116a, developer 106 can set the relevant indicator when checking content into the master repository. The anchor file is normally changed because it contains the metadata that is automatically maintained by the system for each version object. This is also the case when developer 106 only changes the metadata. LMS 140 may recognizes that a file has changed by any of its attributes or other version information including, for example, its size, a hash value, a timestamp, a version identifier, or other similar information. If the file size has not changed, it checks the date and the check sum of the file. If LMS 140 recognizes that a file is not identical to or fails to match its precursors, then it checks the file into the master repository. Delta versioning finds unchanged files in a fast and efficient way by storing the information about copied and referenced files using a data structure stored in a special file, often within the versioning object. This object version file 225 may be any suitable format operable to include the delta versioning information for the particular versioning object it's located or referenced within. For example, object version file 225 may be text, XML, HTML, SQL or other DB table, CSV, a variable and similar such data structures for storage in the versioning object. In other words, object version file 225 may contain the complete list of files which are part of this version object. Then, for each individual file, it may store its name, size, date, MD5 checksum or other hash, or any other suitable versioning information. For example, object version file 225 may include information in the following structure:

```
<?xml version="1.0" encoding="UTF-8" ?>
<LSODELTAVERINFO REUSEOBJ="/Test/Styleguide_for_e-Learning_Content/v1/" VERSION="1">
  <FILE PATH="graphics/manufactured_courseware2.jpg" SIZE="33220" DATE="106BBC5FFB8" HASH="DGwBTmtNtXuDxQPab0ETBg==" />
  <FILE PATH="course_overview2.htm" SIZE="4739" DATE="106BBC5FFB8" HASH="Zgqc4AzHnAOtXw7t0G+xKQ==" />
  <FILE PATH="Storyboard Template for IEs.doc" SIZE="248832" DATE="106BBC5FFB8" HASH="LpZJ7z/sUl8WlwUQfwju5Q==" />
  <FILE PATH="goals_objectives.htm" SIZE="1560" DATE="106BBC5FFB8" HASH="bjyHTK1F8mMhs6qcZ6cq7w==" />
  <FILE PATH ="business_example.htm" SIZE="2011"
```

```
DATE="106BBC5FFB8" HASH="ta3AwYsVrJz9Fg+ByR2nYg==" />
    <FILE PATH="main.crs" SIZE="6824" DATE="106BBC5FFB8"
HASH="QegFVt7jhN9qVCUVHXR1eg==" /> '
    <FILE PATH="Storyboard Template for LN.doc"
SIZE="136704" DATE="106BBC5FFB8"
HASH="7IwHmn0UssLRPOSoVopTfg==" />
    <FILE PATH="0020068250000000584722001E.css" SIZE="5197"
DATE="106BBC5FFB8" HASH="QndHXfzj8gL4nynST1TFwQ==" />
    <FILE PATH="welcome.htm" SIZE="4233"
DATE="106BBC5FFB8" HASH="Y5RjNe+oT5vBIoi8xgg9iw==" />
    ...
</LSODELTAVERINFO>
```

If a copy of the particular content file is already present in a prior version of the object, then the relative path to this file is also stored. For initial versions of objects or new versions of non-delta versioned objects, then there may be no relative link to a prior version. Returning to the example structure above, the developer 106 may have updated one content file within the particular learning object, namely main.crs. This would result in a new object version file as follows:

```
<?xml version="1.0" encoding="UTF-8" ?>
<LSODELTAVERINFO REUSEOBJ="/Test/Styleguide_for_e-
Learning_Content/v2.7757249596584401894/" VERSION="1">
    <FILE PATH="graphics/manufactured_courseware2.jpg"
SIZE="33220" DATE="106BBC5FFB8"
HASH="DGwBTtmtNtXuDxQPab0ETBg=="
REFPATH="../v1/graphics/manufactured_courseware2.jpg" />
    <FILE PATH="course_overview2.htm" SIZE="4739"
DATE="106BBC5FFB8" HASH="Zgqc4AzHnAOtXw7t0G+xKQ=="
REFPATH="../v1/course_overview2.htm" />
    <FILE PATH="Storyboard Template for IEs.doc"
SIZE="248832" DATE="106BBC5FFB8"
HASH="LpZJ7z/sUl8WlwUQfwju5Q==" REFPATH="../v1/Storyboard
Template for IEs.doc" />
    <FILE PATH="goals_objectives.htm" SIZE="1560"
DATE="106BBC5FFB8" HASH="bjyHTK1F8mMhs6qcZ6cq7w=="
REFPATH="../v1/goals_objectives.htm" />
    <FILE PATH="main.crs" SIZE="6844" DATE="106BF7C58C8"
HASH="QegFVt7jhN9qVCUVZ2R1eg==" />
    ...
</LSODELTAVERINFO>
```

Of course, the foregoing examples are for illustration purposes only and may not represent the data, the structure, the metadata, or the format used in learning management systems 140.

To develop or update such content files and the respective learning objects, content developers 106 work in their local repositories. The local repository allows the developer 106 to copy objects from the master repository (as read-only objects) and to create and edit new learning object versions. Objects created in local repositories can be copied and stored back in the master repository. LMS 140 also allows users to "use" objects (via references) without storing the objects in their local repositories. So long as developer 106 does not decide to move object versions to and/or from the master repository, the user can work in a local repository without being connected to the master repository. This work model is often termed the "offline scenario." Similarly, working in the local repository, while being connected to the master repository, is termed the "online scenario." To this end, storing objects from the local repository into the master repository is known as "checking-in." Check-in enables data transfer from the local repository to the master repository. Data is stored in the master repository and can be displayed by other authors when it has been released. When developer 106 checks in content, a check-in wizard (illustrated in FIGS. 6A-D) may guide him through the process. With the check-in wizard, the user can also automatically add all dependent objects to the check-in list. Dependent objects are other objects generally required for displaying the object being checked in.

Figure 6A:
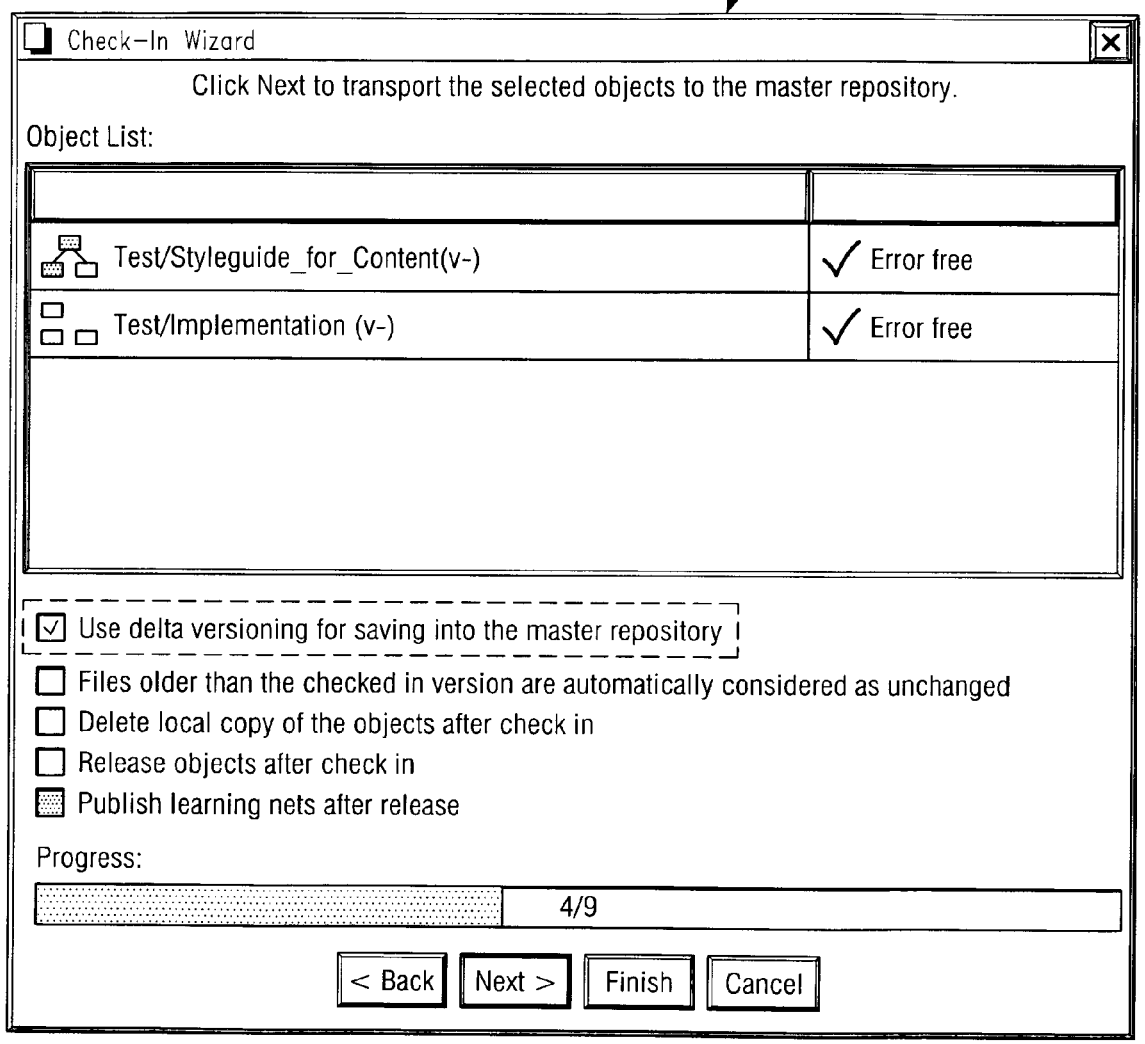
FIGS. 6A-D illustrate an interface of an example check-in wizard implementing certain versioning techniques or process.
Figure 6B:
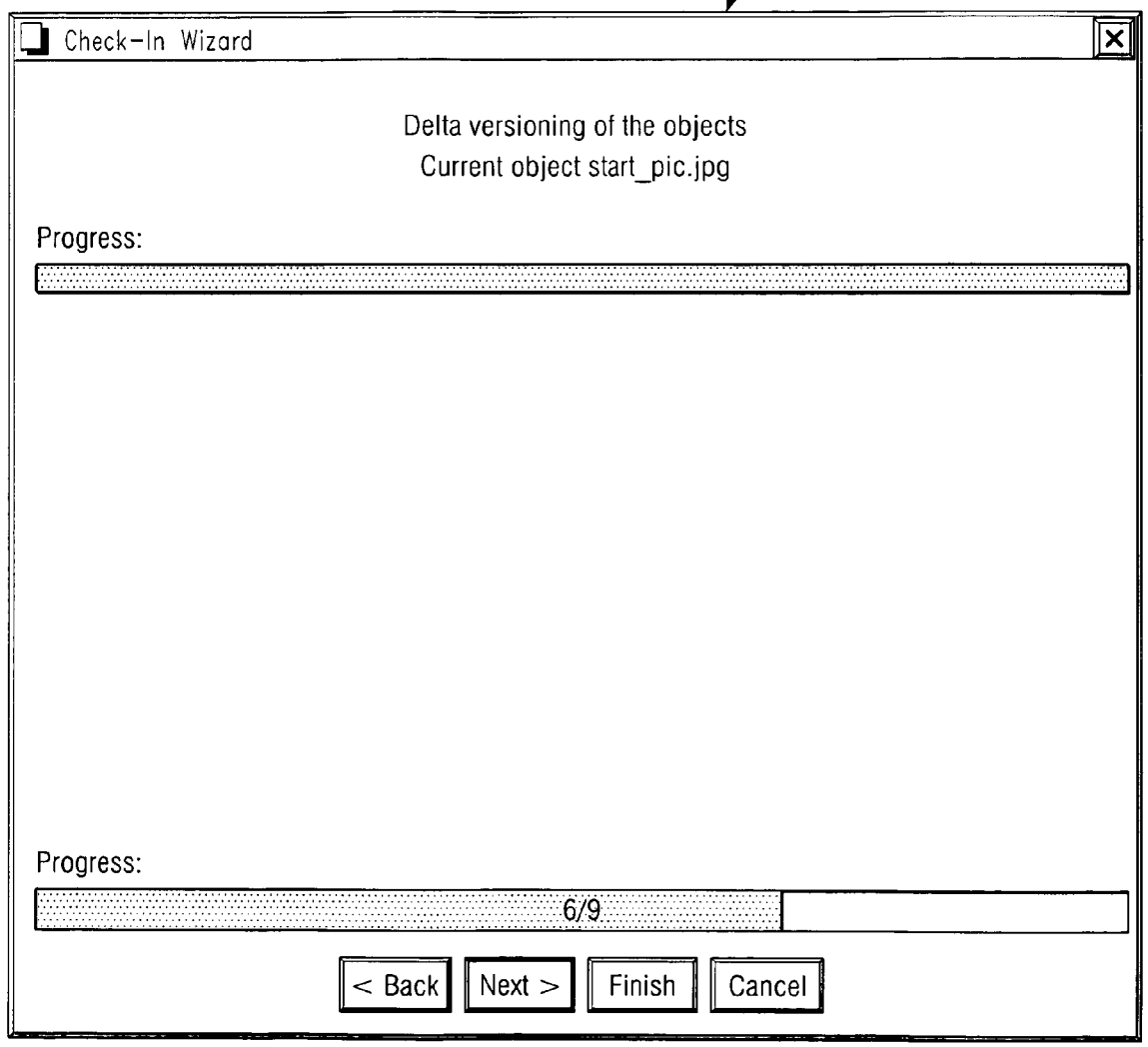
Figure 6C:
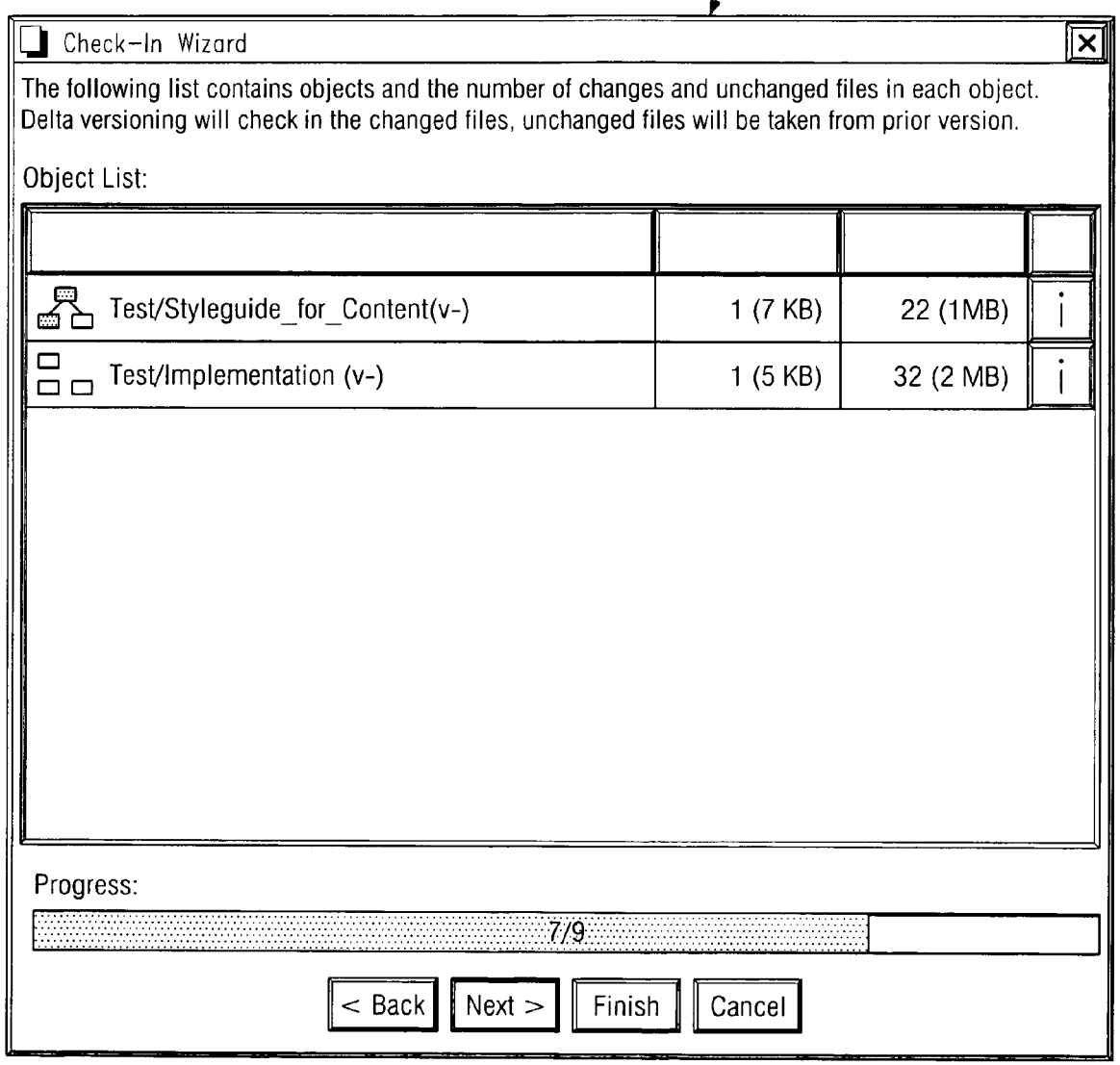
Figure 6D:
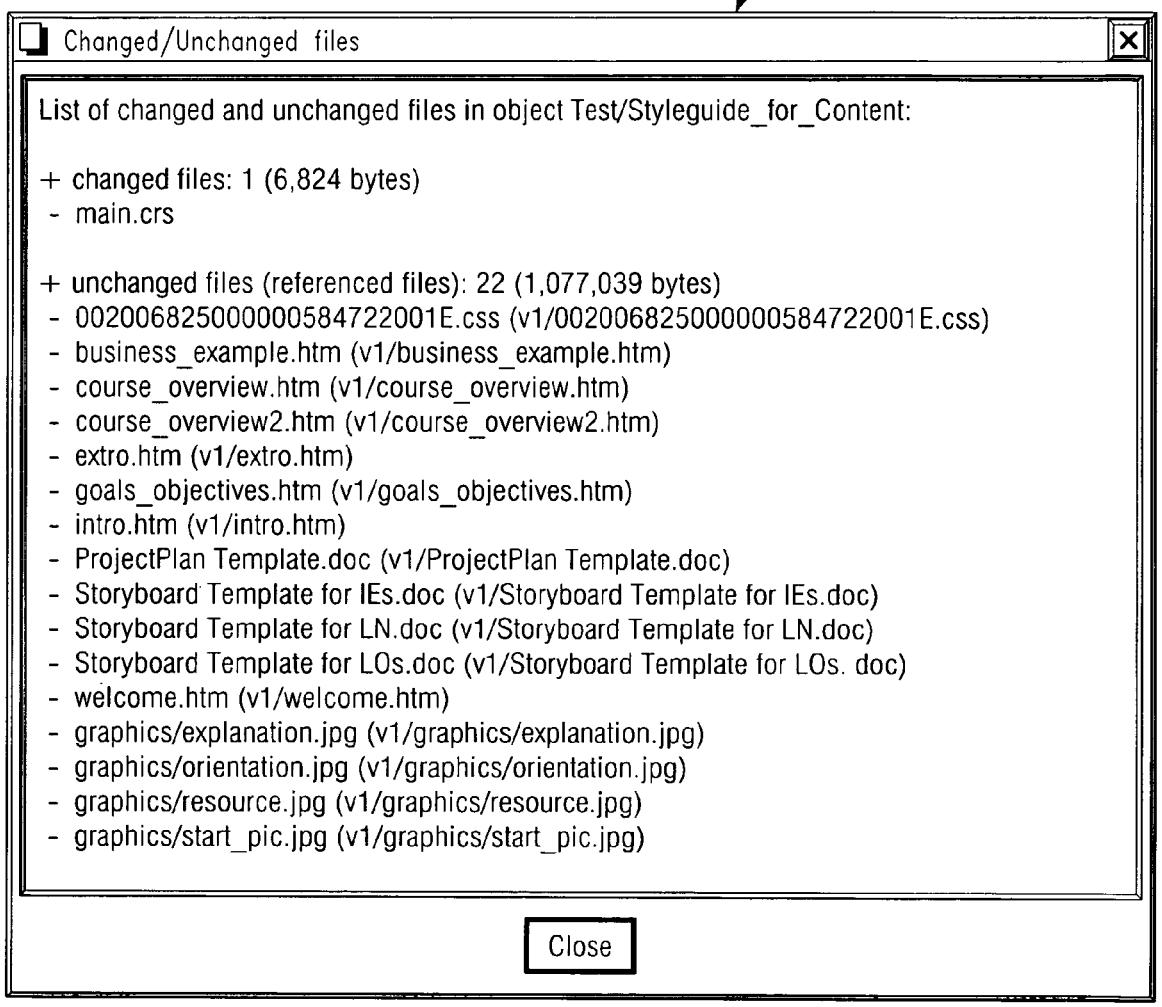
Figure 7A:
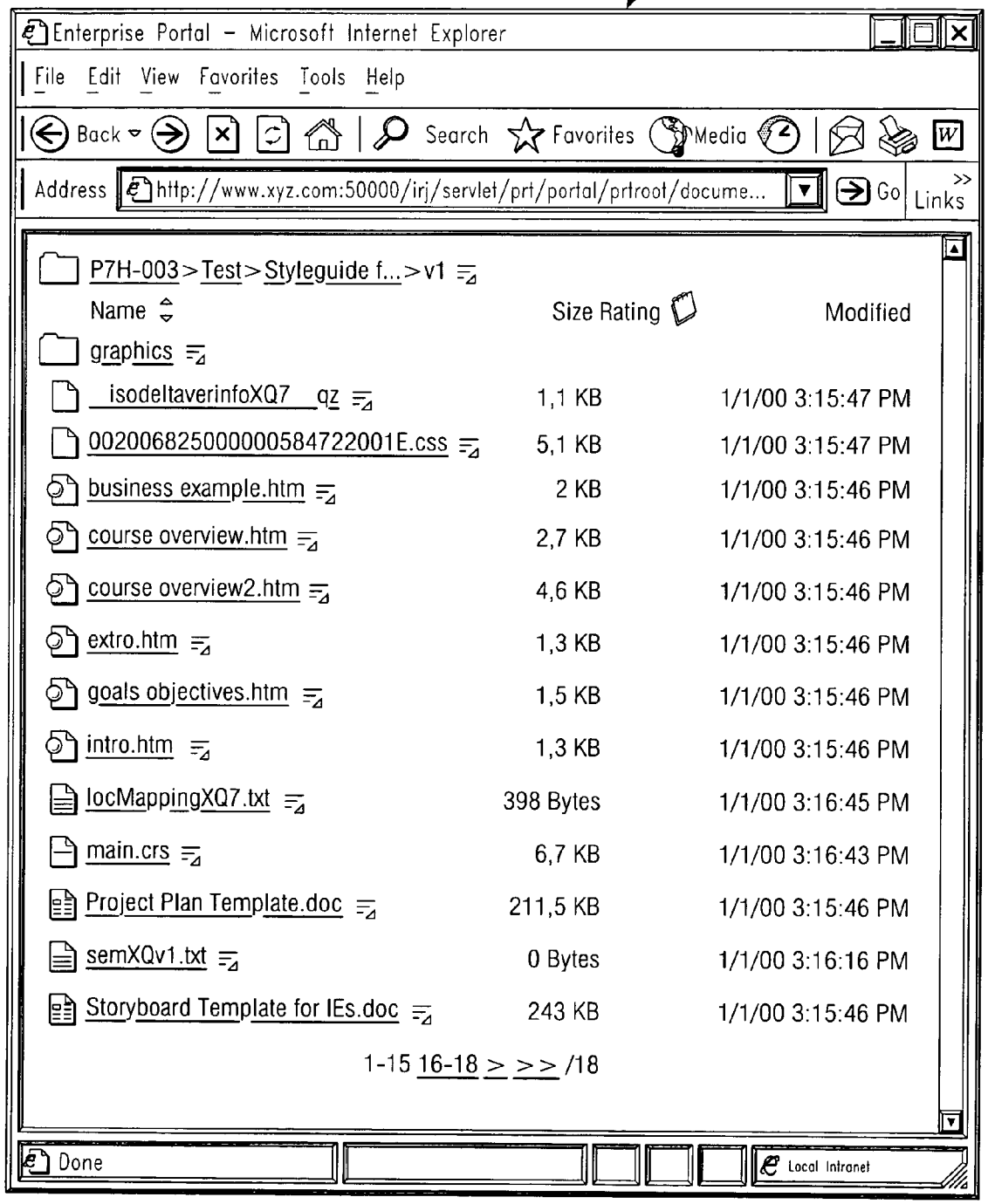
FIGS. 7A-B illustrate an example graphical user interface for viewing versions of learning objects and the respective content files.
Figure 7B:
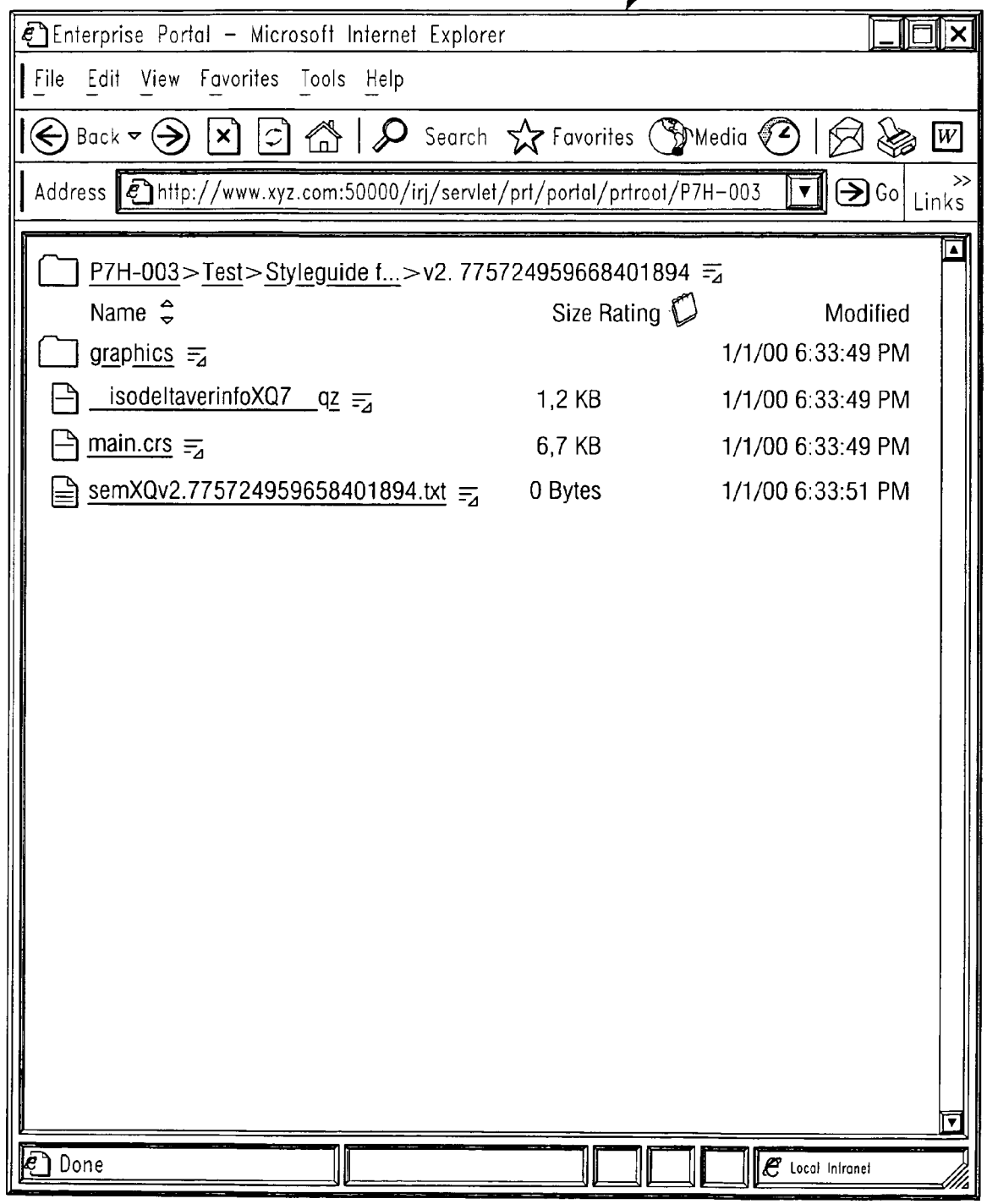

The check-in wizard offers a number of options, which developer 106 select by marking the relevant checkbox. Before check-in, developer 106 can run a consistency check on the cross-references between the objects and their dependencies. As described by 116a in FIG. 6A, developer 106 can also select the indicator Use Delta Versioning When Saving to Master Repository. With this option, only files that developer 106 changed in new versions of learning objects are checked in. Files in versioning objects that were not changed are transferred or referenced from the precursor versions. Developer 106 can select the indicator "Automatically consider files older than checked-in version as unchanged." With this option, such files are not included in the check-in. GUI 116a also presents developer 106 with the ability to delete copies of the object in the local repository after they have been checked in. As illustrated, example GUI 116a also has other options including, after check-in, the ability to automatically release the checked in objects and the ability to have learning nets automatically published when they have been released. FIGS. 6B-D illustrate further steps of the check-in wizard implementing certain delta versioning techniques, namely the current status of process (GUI 116b), a confirmation status page indicating the status of the particular version objects (GUI 116c), and a drill down window presenting detailed file information for the components of the selected version object (GUI 116d). FIGS. 7A-B illustrate example views into the master repository. For example, GUI 116e presents the versioning object as it resides in the master repository and implementing the first example version structure above. In this illustration, GUI 116e presents details of learning object "Styleguide for content." This version of the learning object includes object version file 225, named _1sodeltaverinfoXQ7_.gz, and the plurality of content files included in the learning object. These example content files include main, course overview, intro, extro, and others. After developer 106 creates a new version of the learning object by changing the example main.crs file, the new versioning object is loaded into the master repository, resulting in the updated view via GUI 116f. This example versioning object does not include most of the individual files and instead references them from prior versions. Typically, as described above, the object version file 225 would be used to store such information.

In rare cases, LMS 140 may determine a version conflict during check-in. Such a conflict occurs when the objects to check-in indirectly reference different versions of an object. When this happens, developer 106 may select the version to use in the context of the objects checking in. For example, the check-in wizard may display a step that refers to a structural error in the object checking in. In this case, developer 106 can ignore such errors and proceed with the check-in. Alternatively, developer 106 can cancel the check-in and correct the errors. For example, if not all dependent objects are included in the list, then developer 106 may leave the check-in wizard and edit the dependencies in the local repository. LMS 140 often detects version conflicts by determining that dependant objects of an object to be checked in reference different versions of the same common object, and resolves the conflicts appropriately, as described below. To this end, two "conflict rules" are defined by LMS 140, which are followed in each repository interaction. According to the "first rule," each object version within the master repository must be conflict free, meaning that each object version must not reference, directly or indirectly, any other object in more than one version. According to the "second rule," each local repository must be conflict free, meaning that each local repository must not contain any object in more than one version. In this context "contains" means that a version of an object is either physically stored in the local repository or is referenced from another object that is stored in the local repository. Separation into two rules generally helps the conflict check process to be relatively easy and efficient. For example, compliance with the first rule need be checked only when new objects are checked-in to the master repository. Compliance with the second rule can be checked locally (even in an offline scenario) without regard to the master repository.

Figure 8:
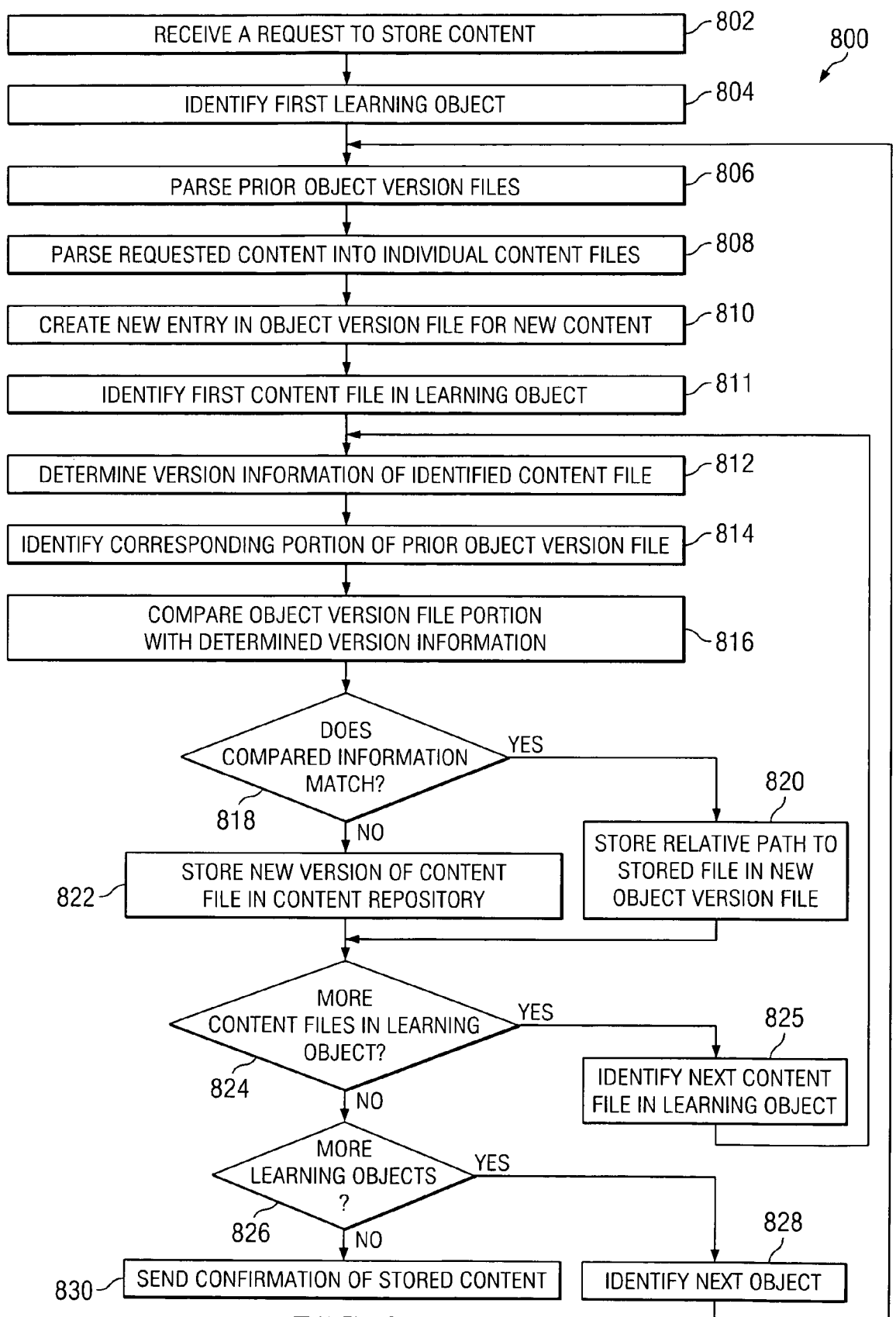
FIG. 8 is a flow diagram illustrating an example method for delta versioning learning objects used by at least a portion of the learning environment of FIG. 1.

FIG. 8 is a flowchart illustrating an example method 800 for implementing delta versioning in accordance with certain embodiments of the present disclosure. As with FIGS. 5A-B, the following description focuses on the operation of learning management system 140 in performing these methods. But environment 100 contemplates using any appropriate combination and arrangement of logical elements implementing some or all of the described functionality. Method 800 begins at step 802, where learning management system 140 receives a request to store content from content developer 106. At step 804, learning management system 140 identifies the first learning object from the content to store. Learning management system 140 loads and parses object version files 225 of previous versions belonging to the particular learning object at step 806. Learning management system 104 may also instantiate or otherwise generate a new versioning object associated with the particular learning object. Learning management system 140 parses the new version object into the associated content files (in the individual learning object) at step 808. Next, learning management system 140 creates a new entry in object version file 225 for each found file at step 808. Then, at step 811, learning management system 140 identifies the first content file in the particular learning object and determines versioning information of the particular content file at step 812. As described above, this version information may include a hash value, a size, a name, a date or timestamp, a version number, or any other information operable to at least partially identify the particular version.

At this point, learning management system 140 then identifies the versioning information of the same file as present in prior versioning objects of the particular learning object at step 814. Next, learning management system 140 compares the identified versioning information of the prior versions with the determined version information of the current content file at step 816. If this versioning information matches with version information from a prior object version as illustrated at decisional step 818, then learning management system 140 stores a relative path to the previously stored content file in the entry of the new object version file at step 820 and processing proceeds to step 826. Otherwise, learning management system 140 determined that the particular content file is a new version of the file and is apparently different (or distinguishable) from versions of this file found in prior object versions. In this case, it then stores this new version of the content file (as part of the object version) in content repository 220 (or the master repository) at step 822. As part of this storage process, learning management system 140 may store new path and versioning information of file in entry of object version file. Once this loading processing is complete for this particular content file, then learning management system 140 determines if there are more content files to be stored from version object at decisional step 824. If there are, it identifies the next content file in the particular learning object at step 825 and processing returns to step 812. Otherwise, learning management system 140 determines if there are more learning objects to be processed. If there are, then learning management system 140 identifies the next learning object and processing returns to step 806. Used in this or other similar ways, learning management system 140 (or authoring environment 210) do not have to send every of the plurality of files associated with the particular versioning object of a learning object. Instead, only those files that have been updated have to be sent, thereby saving time, storage space, and money. Once there are no more learning objects to be processed, then learning management system 140 may send confirmation of the stored content at step 830. As described above, this confirmation may be updating the web site, sending an e-mail, sending a text message, or any other appropriate confirmation technique.

The preceding flowcharts and accompanying descriptions illustrate exemplary methods 500, 550, and 800. But environment 100 contemplates using any suitable technique for performing these and other tasks. Accordingly, many of the steps in these flowcharts may take place simultaneously and/or in different orders than as shown. Moreover, environment 100 may use methods with additional steps, fewer steps, and/or different steps, so long as the methods remain appropriate. For example, it will be understood that content developer 106 may perform some or all of the processing described by method 500, while developing content in a process similar to, but different from, method 550.

A number of embodiments of the invention have been described. Nevertheless, it will be understood that various modifications may be made without departing from the spirit and scope of the invention. Accordingly, other embodiments are within the scope of the following claims.

What is claimed is:

1. A method for versioning learning objects comprising:
receiving, from a content repository local to a client, a request to update a master content repository with an updated learning object, the updated learning object including content files;
comparing version information for each of the content files from the local content repository to versioning information obtained from an object version file identifying a prior version of the updated learning object, the object version file identifies aspects of the content files included in the prior version of the updated learning object;
generating a new object version file associated with updating the master content repository with the updated learning object, the new object version file including pointers to prior versions of content files substantially matching content files from the local content repository;
updating the master content repository with new versions of the content files included in the updated learning object independent of updating the master repository with the content files from the local repository that substantially match content files currently stored in the master repository; and
in response to at least a portion of the version information of a first of the content files matching a corresponding portion of the versioning information stored in the object version file, storing in the new object version file a pointer to a corresponding content file in the prior version of the learning object stored in the master content repository.

2. The method of claim 1, the version information comprising first version information, further comprising:
comparing second version information of a second of the content files to the object version file; and in response to at least a portion of the second version information of the second content file not matching a corresponding portion of the versioning information stored in the object version file:
  storing the second content file in the content repository; and
  storing a new path and versioning information in the corresponding portion of the new object version file.

3. The method of claim 1, the version information comprising first version information, further comprising:
  comparing second version information of a second of the content files to the object version file; and
  in response to at least a portion of the second version information of the second content file matching a corresponding portion of the versioning information stored in the object version file, storing a pointer to a corresponding content file in the prior version of the learning object in the new object version file.

4. The method of claim 3, further comprising identifying the pointer based on the object version file, the pointer comprising a relative path.

5. The method of claim 1, the version information comprising a name of the first content file, a size of the first content file, a date of the first content file, and a hash value.

6. The method of claim 5, the object version file comprising an eXtensible Markup Language (XML) file with a plurality of tags, at least one of the tags comprising version information associated with the first content file.

7. Software for versioning learning objects comprising machine-readable instructions stored on media, the instructions operable when executed to:
  receive, from a content repository local to a client, a request to update a master content repository with an updated learning object, the updated learning object including content files;
  compare version information for each of the content files from the local content repository to versioning information obtained from an object version file identifying a prior version of the updated learning object, the object version file identifies aspects of the content files included in the prior version of the updated learning object;
  generate a new object version file associated with updating the master content repository with the updated learning object, the new object version file including pointers to prior versions of content files substantially matching content files from the local content repository;
  update the master content repository with new versions of the content files included in the updated learning object independent of updating the master repository with the content files from the local repository that substantially match content files currently stored in the master repository; and
  in response to at least a portion of the version information of a first of the content files matching a corresponding portion of the versioning information stored in the object version file, store in the new object version file a pointer to a corresponding content file in the prior version of the learning object stored in the master content repository.

8. The software of claim 7, the version information comprising first version information, further operable to:
  compare second version information of a second of the content files to the object version file; and
  in response to at least a portion of the second version information of the second content file not matching a corresponding portion of the versioning information stored in the object version file:
    store the second content file in the content repository; and
    store a new path and versioning information in the corresponding portion of the new object version file.

9. The software of claim 7, the version information comprising first version information, further operable to:
  compare second version information of a second of the content files to the object version file; and
  in response to at least a portion of the second version information of the second content file matching a corresponding portion of the versioning information stored in the object version file, store a pointer to a corresponding content file in the prior version of the learning object in the new object version file.

10. The software of claim 9, further operable to instantiate a versioning object storing the new object version file and wherein the software operable to store the first content file comprises the software operable to store the first content file in the versioning object and wherein the software operable to store the pointer to the corresponding content file comprises the software operable to store the pointer in the versioning object.

11. The software of claim 9, further operable to identify the pointer based on the object version file, the pointer comprising a relative path.

12. The software of claim 7, the version information comprising a name of the first content file, a size of the first content file, a date of the first content file, and a hash value.

13. The software of claim 12, the object version file comprising an eXtensible Markup Language (XML) file with a plurality of tags, at least one of the tags comprising version information associated with the first content file.

14. A system for versioning learning objects comprising:
  means for receiving a request to update a master content repository with learning content, comprising a plurality of learning objects, from a content repository local to a client, each learning object comprising at least one content file;
  comparison means for comparing first version information of a first of the content files from the local content repository to versioning information obtained from an object version file identifying a prior version of the particular learning object, wherein the object version file identifies aspects of content files included in the particular learning object;
  generating means for generating a new object version file associated with updating the master content repository with the learning content from the local content repository, the master content repository updated with new versions of associated content files, the new object version file updated with pointers to prior versions of content files substantially matching content files from the local content repository;
  in response to at least a portion of the first version information of the first content file not matching a corresponding portion of the versioning information stored in the object version file:
    storing means for storing the first content file in the master content repository; and
    means for updating the corresponding portion of the object version file with the first version information;
  the comparison means comparing second version information of a second of the content files to the object version file; and
  in response to at least a portion of the second version information of the second content file matching a corresponding portion of the versioning information stored in the object version file, the storing means storing in the new object version file a pointer to a learning object copy stored in the master content repository.

15. A learning management system (LMS) comprising:
a master repository storing an archived copy of each of a plurality of learning objects and an object version file, each learning object comprising at least one content file;
an interface for receiving a second plurality of content files arranged in a second plurality of learning objects, at least a first subset of the plurality of content files corresponding to a second subset of the second plurality of content files, the object version file associated with the first subset; and
one or more processors operable to:
compare version information for each of the content files from the local content repository to versioning information obtained from an object version file identifying a prior version of the updated learning object, the object version file identifies aspects of the content files included in the prior version of the updated learning object;
generate a new object version file associated with updating the master content repository with the updated learning object, the new object version file including pointers to prior versions of content files substantially matching content files from the local content repository;
update the master content repository with new versions of the content files included in the updated learning object independent of updating the master repository with the content files from the local repository that substantially match content files currently stored in the master repository; and
in response to at least a portion of the version information of a first of the content files matching a corresponding portion of the versioning information stored in the object version file, store in the new object version file a pointer to a corresponding content file in the prior version of the learning object stored in the master content repository.

16. The LMS of claim 15, the interface operable to receive the second plurality of content files from a remote content developer.

17. The LMS of claim 15, the interface operable to receive the second plurality of content files from a local client.

18. The LMS of claim 15, the processors further operable to instantiate a versioning object storing the new object version file and wherein the processors operable to store the first content file comprises the processors operable to store the first content file in the versioning object and wherein the processors operable to store the pointer to the corresponding content file comprises the processors operable to store the pointer in the versioning object.

19. A method for managing versioned content files, comprising:
receiving a request for learning content from a user, the learning content associated with a plurality of learning objects, each learning object comprising at least one content file and at least a subset of the learning object files being reusable for other learning content;
identifying a versioning object from a content repository based, at least in part, on a first learning object in the requested request, wherein the version object identifies updated content files for the first learning object and a relative path to content files substantially matching content files of a prior version of the first learning object;
generating a mapping table from the versioning object, the table comprising a plurality of mapping entries, each entry indicating a relative path for one of the plurality of content files;
comparing a first content file in the first learning object to the mapping table;
if a mapping entry is found for a particular requested content file, collecting the referenced file using the relative path; and
if no mapping is found for the particular requested content file, collecting the referenced file from the versioning object.

20. The method of claim 19, wherein the loading, generating, comparing, and collecting steps are performed at an API and the method further comprises communicating the one or more collected content files from the API to a network-based application for presentation to the user.

* * * * *